United States Patent
Maruyama et al.

(10) Patent No.: US 6,679,685 B2
(45) Date of Patent: Jan. 20, 2004

(54) METHOD AND DEVICE FOR DISCHARGING VISCOUS FLUIDS

(75) Inventors: Teruo Maruyama, Hirakata (JP); Takashi Sonoda, Shiga-ken (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 0 days.

(21) Appl. No.: 10/118,156

(22) Filed: Apr. 9, 2002

(65) Prior Publication Data

US 2003/0012667 A1 Jan. 16, 2003

Related U.S. Application Data

(63) Continuation-in-part of application No. 09/799,682, filed on Mar. 7, 2001.

(30) Foreign Application Priority Data

| Mar. 7, 2000 | (JP) | ................................................ | 2000-61471 |
| Jun. 23, 2000 | (JP) | ................................................ | 2000-188899 |
| Nov. 8, 2000 | (JP) | ................................................ | 2000-340000 |
| Apr. 10, 2001 | (JP) | ................................................ | 2001-110945 |

(51) Int. Cl.$^7$ ................................................ F04B 9/14
(52) U.S. Cl. ...................... 417/374; 417/44.1; 417/205; 222/333; 239/537; 239/581.2; 239/586.5
(58) Field of Search .................... 417/44.1, 53, 201, 417/205, 374; 222/333; 239/537, 538, 539, 541, 581.2, 584, 585, 1, 585.4, 585.5

(56) References Cited

U.S. PATENT DOCUMENTS

| 2,429,978 | A |   | 11/1947 | Blanchard |   |
| 4,320,858 | A |   | 3/1982 | Mercer et al. |   |
| 4,470,752 | A | * | 9/1984 | Teruo et al. | ................... 415/72 |
| 5,699,934 | A | * | 12/1997 | Kolcun et al. | ................. 222/1 |
| 5,819,983 | A |   | 10/1998 | White et al. |   |
| 6,086,183 | A | * | 7/2000 | Nakahara | ..................... 347/30 |
| 6,364,622 | B1 | * | 4/2002 | Lishanski et al. | ............. 417/53 |

FOREIGN PATENT DOCUMENTS

| JP | 57-188796 |   | 11/1982 |
| JP | 10-128217 |   | 5/1998 |
| JP | 410128217 A | * | 5/1998 |
| JP | 11-10866 |   | 1/1999 |
| JP | 11010866 | * | 1/1999 |
| JP | 2000-167467 |   | 6/2000 |
| JP | 02000167467 A | * | 6/2000 |
| JP | 2002-1192 |   | 8/2002 |
| WO | 98/50701 |   | 11/1998 |
| WO | 99/49987 |   | 10/1999 |

* cited by examiner

Primary Examiner—Charles G. Freay
Assistant Examiner—John F Belena
(74) Attorney, Agent, or Firm—Wenderoth, Lind & Ponack, L.L.P.

(57) ABSTRACT

A method of discharging a fluid, includes feeding a fluid into a gap defined between two surfaces in a closed space, and relatively oscillating the two surfaces to apply relative oscillation with high frequency to the gap so as to occur a squeeze pressure to the gap, and thus intermittently discharging the fed fluid through a discharge port provided in either one of the two surfaces by using the squeeze pressure.

21 Claims, 19 Drawing Sheets

METHOD AND DEVICE FOR DISCHARGING VISCOUS FLUIDS

This is a continuation-in-part of Ser. No. 09/799,682, filed Mar. 7, 2001.

BACKGROUND OF THE INVENTION

The present invention relates to a method and device for discharging a fluid at a very small flow rate, which is required in fields such as information and precision mechanical equipment, machine tool, FA (Factory Automation), and the like or in various processes of producing a semiconductor device, liquid crystal display, and display unit; and surface mounting; and the like.

The processing precision in machine work is changing from the order of microns to the order of submicrons. Submicron processing is usually performed in the field of semiconductor and electronic components, but demand for ultraprecision machining is also rapidly increasing in the field of machine work, which is progressing along with mechatronics. In recent years, an electro-magnetostrictive element represented by a giant-magnetostrictive element and a piezoelectric element is being used as a micro actuator along with introduction of ultraprecision machining techniques.

A jet device, which jets a very small flow rate of droplets at high speed by utilizing this electro-magnetostrictive element as a source for generating a fluid pressure, is used in various fields.

FIG. 21 shows an example of a conventional head in an inkjet recording device (Unexamined Japanese Patent Publication No. 11-10866). Reference numeral 3401 denotes a base. Reference numeral 3402 denotes an oscillation (vibration) plate. Reference numeral 3403 denotes a laminated piezoelectric element. Reference numeral 3404 denotes an ink chamber. Reference numeral 3405 denotes a common ink chamber. Reference numeral 3406 denotes an ink flow passage. Reference numeral 3407 denotes a nozzle plate. Reference numeral 3408 is a discharge nozzle.

When a voltage is applied to the piezoelectric element 3403, which is a pressure applying means, the piezoelectric element 3403 deforms the oscillation plate 3402 in the thickness direction, thereby reducing the volume of the ink chamber 3404.

Since a fluid is compressed and a pressure in the ink chamber is increased, a part of the fluid is passed through the ink flow passage and flows back to the common ink chamber 3405 side. The remaining portion is discharged from the nozzle to the atmosphere.

A method of jetting an arbitrary droplet by using a giant-magnetostrictive element is disclosed in, for example, Unexamined Japanese Patent Publication No. 2000-167467.

In FIG. 22, reference numeral 3502 denotes a cylinder made of a nonmagnetic material such as a glass pipe, stainless pipe, or the like. A fluid reservoir 3503 and a jet nozzle 3504 having a very small jet port are formed at an end portion of this cylinder 3502.

An actuator 3505 made of a giant-magnetostrictive material in a rod-like shape is housed movably inside the cylinder 3502. A piston 3506 is removably disposed at an end portion of the actuator 3505 facing the jet nozzle 3504.

A spring 3508 is disposed between the other end portion of the actuator 3505 and a stopper 3507 at an end portion so that the actuator 3505 is energized to proceed by the spring 3508. Furthermore, a coil 3509 is wound to the outer periphery of the cylinder 3502 at a position close to the piston 3506.

In the jet device having the above constitution, a current is allowed to flow in the coil 3509 instantaneously so that an instantaneous magnetic field is allowed to act on the giant-magnetostrictive material to generate an instantaneous transitional displacement due to an elastic wave at an axial end portion of the giant-magnetostrictive material. The fluid filled in the cylinder can be jet from the nozzle as one very small droplet by this action.

Conventionally, as a fluid discharge device, an air pulse-type dispenser as shown in FIG. 23 is widely used, and such a technique is introduced in, for example, Automation Technique '93, vol. 25 (7) or the like.

In a dispenser of this type, a fixed amount of pulsed air supplied from a constant pressure source is applied to the inside 152 of a container 150 (cylinder) so that a certain amount of fluid corresponding to a rise of the pressure in a cylinder 150 is discharged from a nozzle 151.

In a field of formation of a circuit, which is increasingly made highly precise and ultrafine in recent years, or a field of manufacturing processes of electrodes and ribs of imaging tubes such as PDP, CRT, and the like, fluorescent screens, liquid crystal displays, optical discs, and so forth, most of fluids for fine coating are high-viscosity powder fluids.

The most significant challenge is to coat a target board with the powder fluid containing ultrafine particles at high speed, in high precision, and with high reliability, without blocking the flow passage.

For example, in the case of coating an imaging tube such as PDP, CRT, or the like with a fluorescent substance, the grain size of the fine particle is usually 7–9 $\mu$m, and the specific weight is about 4.0–5.0 kg/m$^3$.

Conventionally, an attempt is made that the imaging tube is coated with the fluorescent substance by using an air nozzle-type dispenser conventionally used in a field of circuit mounting or the like. Since continuous coating with high-viscosity fluid at high speed is difficult in the case of the air nozzle-type dispenser, fine particles are diluted with a low-viscosity fluid before coating. However, in this case, there is a problem that, when the flow of the fluid is stopped, the fine particles are immediately deposited inside the flow passage due to the weight of a single particle.

Furthermore, the discharge device using a piezoelectric material or giant-magnetostrictive material as a drive source as described above is originally used for coating with a low-viscosity fluid containing no powder. It is difficult to respond to the aforementioned challenge related to the coating process of high-viscosity fluids and powder fluids.

In order to respond to various demands related to coating at a very small flow rate in recent years, the inventors of the present invention proposed a coating method wherein the discharge amount is controlled by applying a relative linear motion and rotary motion between a piston and a cylinder, transporting a fluid by the rotary motion, and changing a relative gap between the fixed side and the rotated side by the linear motion, and applied this method as "device and method for feeding fluid" (Japanese Patent Application No.2000-188899; Unexamined Japanese Patent Publication No. 2002-11929).

Accordingly, an object of the present invention is to provide a method for further simplifying the structure of the above proposal by performing a strict theoretical analysis by limiting the above proposal to the case of intermittent coating and finding a specific structural condition for improving a pump performance based on its results.

SUMMARY OF THE INVENTION

In accomplishing these and other aspects, according to a first aspect of the present invention, there is provided a method of discharging a fluid, comprising feeding a fluid into a gap defined between two surfaces in a closed space, and relatively oscillating the two surfaces to apply relative oscillation with high frequency to the gap so as to occur a squeeze pressure to the gap, and thus intermittently discharging the fed fluid through a discharge port provided in either one of the two surfaces by using the squeeze pressure.

According to a second aspect of the present invention, there is provided a method of discharging a fluid according to the 1st aspect, wherein the discharge amount $Q_s$ (mm³) per dot generally represented by $$Q_s = \frac{1}{R_n + R_p}\left\{(r_0^2 - r_i^2) + 2r_i^2 \ln\frac{r_i}{r_0}\right\}\left(\frac{6\mu\Delta h}{h_0^3}\right)$$

where an amplitude of a change of the gap between the two surfaces is $\Delta h$ (mm), a central value of a size of the gap is $h_0$ (mm), a mean radius of outer peripheries of the two surfaces is $r_0$ (mm), a mean radius of an opening of the discharge port is $r_i$ (mm), a viscosity coefficient of the fluid is $\mu$ (kgf·sec/mm²), fluid resistance between the outer peripheries of the two surfaces and the opening of the discharge port is $R_p$ (kgf·sec/mm⁵), and fluid resistance of the discharge port is $R_n$ (kgf·sec/mm⁵), is controlled by controlling the amplitude $\Delta h$.

According to a third aspect of the present invention, there is provided a method of discharging a fluid according to the 1st aspect, wherein a mean discharge amount $Q_{sm}$ (mm³) generally represented by $$Q_{sm} = \frac{n}{R_n + R_p}\left\{(r_0^2 - r_i^2) + 2r_i^2 \ln\frac{r_i}{r_0}\right\}\left(\frac{6\mu\Delta h}{h_0^3}\right)$$

where an amplitude of a change of the gap between the two surfaces is $\Delta h$ (mm), a central value of a size of the gap is $h_0$ (mm), a mean radius of outer peripheries of the two surfaces is $r_0$ (mm), a mean radius of an opening of the discharge port is $r_i$ (mm), a viscosity coefficient of the fluid is $\mu$ (kgf·sec/mm²), fluid resistance between the outer peripheries of the two surfaces and an opening of the discharge port is $R_p$ (kgf·sec/mm⁵), fluid resistance of the discharge port is $R_n$ (kgf·sec/mm⁵), and a number of coating per unit time is n (1/sec), is controlled by controlling the amplitude $\Delta h$ or the number n of coating per unit time.

According to a fourth aspect of the present invention, there is provided a fluid discharge device comprising a fluid feed device for feeding a fluid into a gap defined between two surfaces in a closed space, and a relatively oscillating device for relatively oscillating the two surfaces to apply relative oscillation with high frequency to the gap so as to occur a squeeze pressure to the gap, so that the fed fluid is intermittently discharged through a discharge port provided in either one of the two surfaces by using the squeeze pressure, wherein the following is satisfied:

$$Q_{gmax} > \frac{0.2n}{\varphi}Q_s$$

where a maximum discharge amount of the fluid that can be fed by the fluid feed device is $Q_{gmax}$ (mm³/sec), a coating amount per dot discharged by the two surfaces is $Q_s$ (mm³), a number of coating per unit time is n (1/sec), one cyclic period of coating process is $T_s$ (sec), and time when the two surfaces are positioned so that the gap therebetween is large is $T_g$ (sec), and $\phi = T_g/T_s$.

According to a fifth aspect of the present invention, there is provided a fluid discharge device according to the 4th aspect, wherein the following is satisfied:

$$Q_{gmax} > \frac{n}{\varphi}Q_s$$

According to a sixth aspect of the present invention, there is provided a fluid discharge device according to the 4th aspect, wherein the following is satisfied:

$$Q_{gmax} > \frac{1}{\varphi} \cdot \frac{n}{(R_n + R_p)}\left\{(r_0^2 - r_i^2) + 2r_i^2 \ln\frac{r_i}{r_0}\right\}\left(\frac{6\mu\Delta h}{h_0^3}\right)$$

where an amplitude of a change of the gap between the two surfaces is $\Delta h$ (mm), a central value of a size of the gap is $h_0$ (mm), a mean radius of outer peripheries of the two surfaces is $r_0$ (mm), a mean radius of an opening of the discharge port is $r_i$ (mm), a viscosity coefficient of the fluid is $\mu$ (kgf·sec/mm²), fluid resistance between the outer peripheries of the two surfaces and an opening of the discharge port is $R_p$ (kgf·sec/mm⁵), fluid resistance of the discharge port is $R_n$ (kgf·sec/mm⁵) and a number of coating per unit time is n (1/sec), a maximum discharge amount of the fluid that can be fed by the fluid feed device is $Q_{gmax}$ (mm³/sec), one cyclic period of coating process is $T_s$ (sec), and time when the two surfaces are positioned so that the gap therebetween is large is $T_g$ (sec), and $\phi = T_g/T_s$.

According to a seventh aspect of the present invention, there is provided a fluid discharge device according to the 4th aspect, wherein the fluid feed device is a screw groove pump.

According to an eighth aspect of the present invention, there is provided a fluid discharge device comprising a fluid feed device for feeding a fluid into a gap defined between two surfaces in a closed space, and a relatively oscillating device for relatively oscillating the two surfaces to apply relative oscillation with high frequency to the gap so as to occur a squeeze pressure to the gap, so that the fed fluid is intermittently discharged fluid through a discharge port provided in either one of the two surfaces by using the squeeze pressure, wherein $R_p/R_n > 0.5$ is satisfied when fluid resistance between an outer peripheries of the two surfaces and an opening of the discharge port is $R_p$ (kgf·sec/mm⁵), fluid resistance of the discharge port is $R_n$ (kgf·sec/mm⁵).

According to a ninth aspect of the present invention, there is provided a fluid discharge device according to the 8th aspect, wherein $R_p/R_n > 2$ is satisfied.

According to a 10th aspect of the present invention, there is provided a fluid discharge device according to the 8th aspect, wherein $R_p/R_n > 5$ is satisfied.

According to an 11th aspect of the present invention, there is provided a fluid discharge device comprising a fluid feed device for feeding a fluid into a gap defined between two surfaces in a closed space, and a relatively oscillating device for relatively oscillating the two surfaces to apply relative oscillation with high frequency to the gap so as to occur a squeeze pressure to the gap, so that the fed fluid is intermittently discharged through a discharge port provided in either one of the two surfaces by using the squeeze pressure, wherein $0.1 < r_i/r_0 < 0.3$ is satisfied when the mean radius of outer peripheries of the two surfaces is $r_0$ (mm) and the mean radius of an opening of the discharge port is $r_i$ (mm).

According to a 12th aspect of the present invention, there is provided a fluid discharge device according to the 11th aspect, wherein $r_i/r_0 \approx 0.2$ is satisfied.

According to a 13th aspect of the present invention, there is provided a method of discharging a fluid according to the 2nd aspect, wherein the relatively oscillating device is an electro-magnetostrictive element.

According to a 14th aspect of the present invention, there is provided a method of discharging a fluid according to the 2nd aspect, wherein the fluid is discharged by utilizing a rise of a localized pressure in a vicinity of the discharge port in the two surface.

According to a 15th aspect of the present invention, there is provided a fluid discharge device according to the 7th aspect, wherein a protrusion is formed in the two surface in a vicinity of the discharge port so that the gap between the two surfaces is smaller there than in other portions.

According to a 16th aspect of the present invention, there is provided a fluid discharge device according to the 15th aspect, wherein a flow passage except for a portion between the protrusion and its opposed surface is equipped with a device for smoothing a changing pressure.

According to a 17th aspect of the present invention, there is provided a method of discharging a fluid according to the 2nd aspect, wherein, in discharging the fluid, while relatively moving a target surface onto which the fluid is discharged and a discharge nozzle connected to the discharge port, relative positions of the target surface and the discharge nozzle and timing of a displacement input signal h are matched, considering that coating is performed at a phase generally $\Delta\theta=\pi/2$ ahead of the displacement input signal h of the gap.

According to an 18th aspect of the present invention, there is provided a fluid discharge device comprising a sleeve for housing a shaft, a housing for housing the shaft and the sleeve, a device for rotating the sleeve relatively to the housing, an axial direction drive device for displacing the shaft relatively to the housing in an axial direction of the shaft a pump chamber being formed by the sleeve and the housing, a fluid feed device for feeding a fluid to the pump chamber, a suction port and a discharge port of the fluid for connecting the pump chamber and the outside being formed in the housing, and a device for forcibly feeding the fluid allowed to flow into the pump chamber to the discharge port side by the axial direction drive device, wherein $R_p/R_n>0.5$ is satisfied when fluid resistance between an outer peripheries of the shaft and an opening of the discharge port is $R_p$ (kgf·sec/mm$^5$), fluid resistance of the discharge port is $R_n$ (kgf·sec/mm$^5$).

According to a 19th aspect of the present invention, there is provided a fluid discharge device comprising a sleeve for housing a shaft, a housing for housing the shaft and the sleeve, a device for rotating the shaft relatively to the housing, an axial direction drive device for displacing the sleeve relatively to the housing in an axial direction of the sleeve, a pump chamber being formed by the sleeve and the housing, a fluid feed device for feeding a fluid to the pump chamber, a suction port and a discharge port of the fluid for connecting the pump chamber and the outside being formed in the housing, and a device for forcibly feeding the fluid allowed to flow into the pump chamber to the discharge port side by the axial direction drive device, wherein $R_p/R_n>0.5$ is satisfied when fluid resistance between an outer peripheries of the shaft and an opening of the discharge port is $R_p$ (kgf·sec/mm$^5$), fluid resistance of the discharge port is $R_n$ (kgf·sec/mm$^5$).

According to a 20th aspect of the present invention, there is provided a fluid discharge device according to the 18th aspect, wherein a dynamic pressure seal is formed between the sleeve and the housing so that discharge of the fluid from the discharge port is blocked when driving of the axial direction drive device is stopped.

According to a 21st aspect of the present invention, there is provided a fluid discharge device according to the 19th aspect, wherein a dynamic pressure seal is formed between the sleeve and the housing so that discharge of the fluid from the discharge port is blocked when driving of the axial direction drive device is stopped.

According to a 22nd aspect of the present invention, there is provided a fluid discharge device according to the 20th aspect, wherein $P_s>P_{s0}$ is satisfied when a seal pressure when a flow rate of the dynamic pressure seal is $P_s$ and a pressure due to the fluid feed device is $P_{s0}$.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1A:
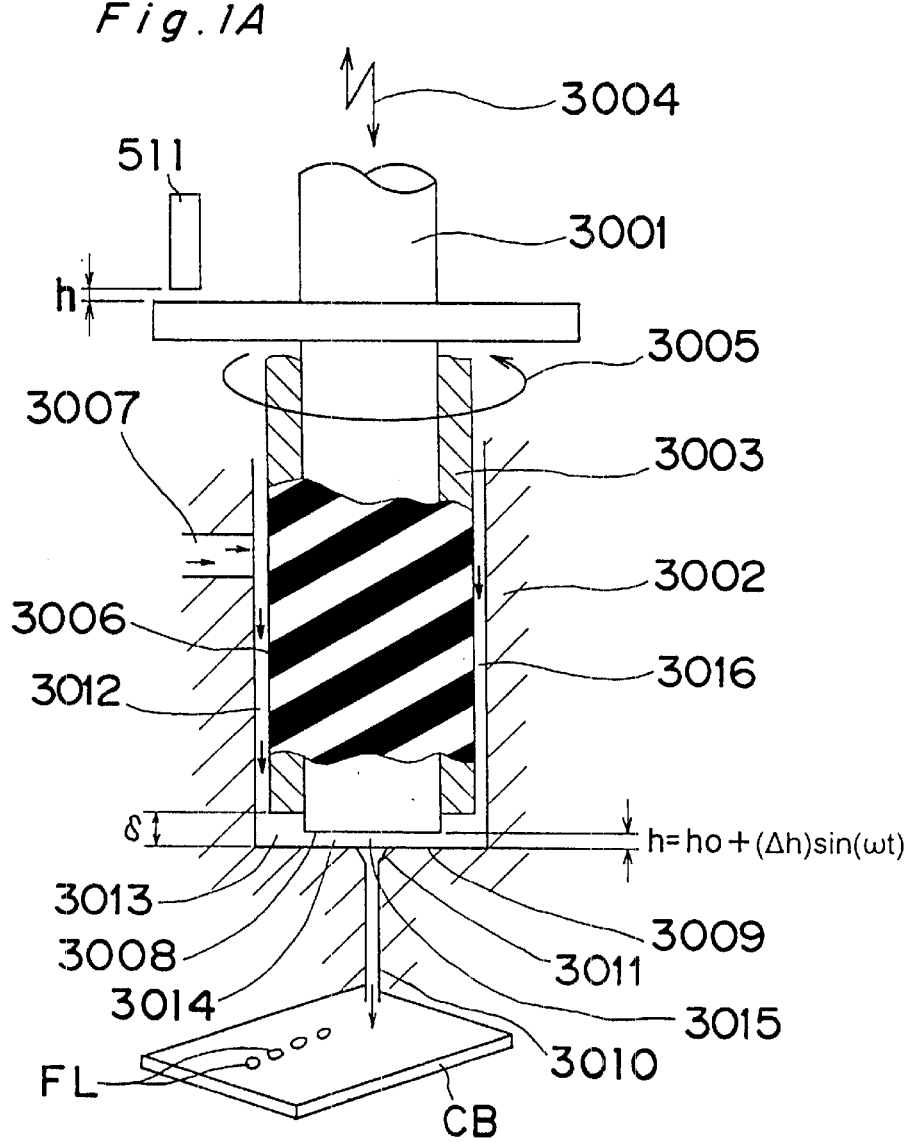
FIG. 1A is a model view showing a first embodiment of the present invention.

Before the description of the present invention proceeds, it is to be noted that like parts are designated by like reference numerals throughout the accompanying drawings.

FIG. 1 is a model view showing a first embodiment of the present invention. Reference numeral 3001 is a piston, which is housed movably in an axial direction in a housing 3002. Reference numeral 3003 is a sleeve for housing an outer peripheral portion of the piston 3001, which is housed movably in a rotary direction in the housing 3002 with the housing 3002 being the fixed side.

The piston 3001 and the sleeve 3003 are driven by an axial direction drive device (for driving reciprocal and axial direction movement shown by an arrow 3004) and a rotation transmitting device (for driving rotation shown by an arrow 3005), respectively. Reference numeral 3006 denotes a screw groove (black solid portion) formed in relatively moved surfaces of the sleeve 3003 and the housing 3002. Reference numeral 3007 denotes a suction port of a fluid. Reference numeral 3008 denotes an end surface of the piston 3001, and reference numeral 3009 denotes its opposed surface on the fixed side, that is, a bottom surface of the housing 3002 facing a housing chamber in the housing 3002. Reference numeral 3010 denotes a discharge nozzle formed in the central portion of the opposed surface 3009 on the fixed side. Reference numeral 3011 denotes an opening of the discharge nozzle 3010 formed in the opposed surface 3009 on the fixed side. The relatively moved surfaces are constructed of the end surface 3008 of the piston 3001 and the opposed surface 3009 on the fixed side. The relatively moved surfaces are constructed of the end surface 3008 of the piston 3001 and the opposed surface 3009 on the fixed side, that is, the bottom surface of the housing 3002 facing the housing chamber.

Reference numeral 3012 denotes a coating fluid fed between the sleeve 3003 and the housing 3002. Reference numeral 3013 denotes an end portion of the pump chamber formed between a lower end portion of the screw groove 3006 and the housing 3002 (outer periphery of the piston). A fluid is fed in this pump chamber end portion 3013 by a screw groove pump, which is one example of a fluid feed device, at all times.

Figure 20:
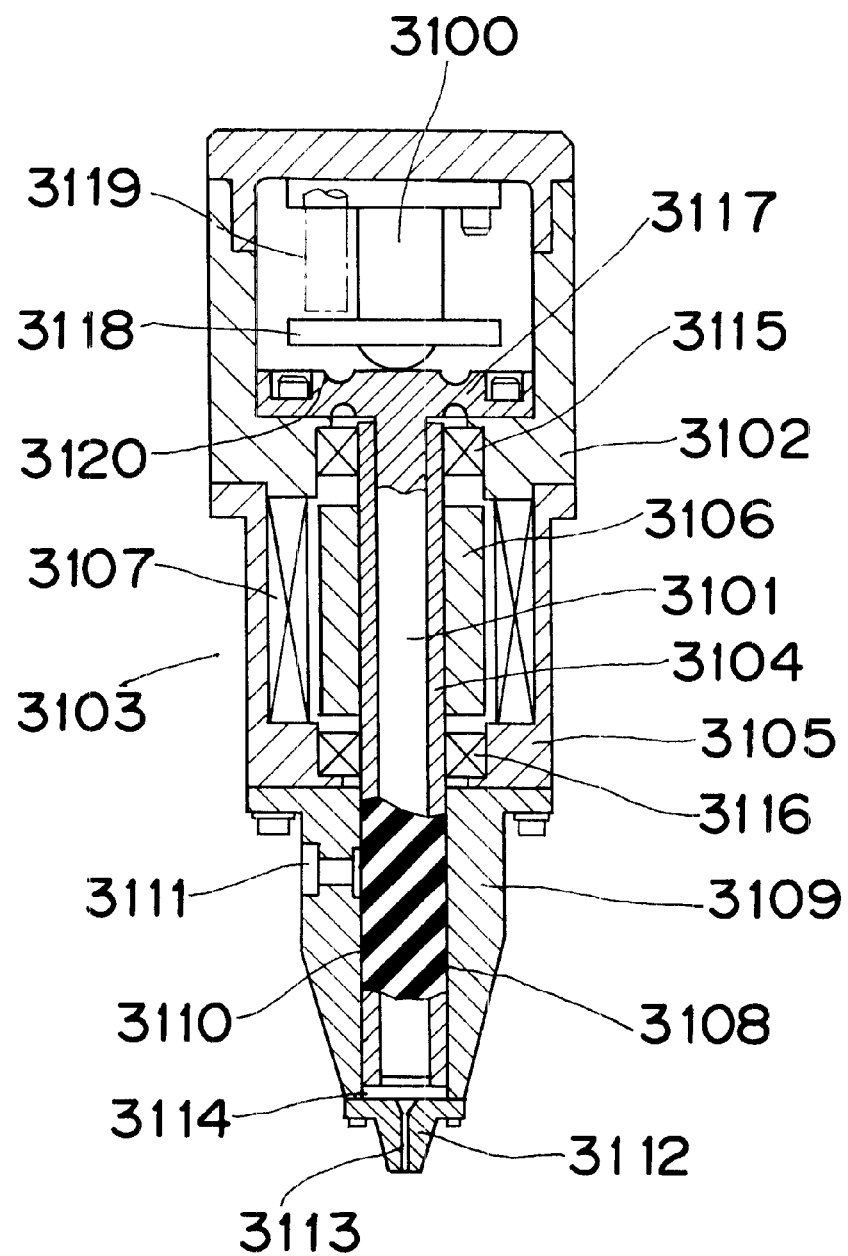
FIG. 20 is a front cross sectional view showing a dispenser according to a specific embodiment of the present invention.

The axial direction drive device 3004 (its specific structure is shown in FIG. 20) is disposed between the piston 3001 and the housing 3002 and changes relative positions of these two members 3001, 3002 in the axial direction. A gap h between the piston end surface 3008 and its opposed surface 3009 can be changed by this axial direction drive device 3004.

When the gap h is changed by a frequency f ($=\omega/2\pi$) where "$\omega$" is an angular acceleration of oscillation (vibration) generated by the piston 3001 at the gap, and the mean value of the gap h is set to be, for example, of the order of a few tens of microns, a positive pressure and a negative pressure are alternately generated in the gap between the piston end portion 3008 and its opposed surface 3009 due to a squeeze effect of a viscous fluid. This gap is referred to as a squeeze pump 3014, and a gap formed by the screw groove 3006 and the housing 3002 is referred to as a pump chamber 3016. A portion positioned at reference numeral 3015 in the central portion of the piston end surface 3008 is defined as the upstream side of the discharge nozzle 3010. The present embodiment is based on an idea that intermittent coating can be achieved at high speed by utilizing this squeeze effect.

[1] Theoretical Analysis (1) Drawing Fundamental Equations

In order to reveal principles and effects of the present invention, fundamental equations of the squeeze pump (tentative name) are drawn.

A fluid pressure when a viscous fluid is placed in a narrow gap between planes opposed to each other and the gap size changes with time can be obtained by solving the following Reynolds equation including a term of a squeeze action in polar coordinates.

$$\frac{1}{r}\frac{d}{dr}\left(r\frac{h^3}{12\mu}\frac{dP}{dr}\right)=\frac{dh}{dt} \qquad (1)$$

Figure 2:
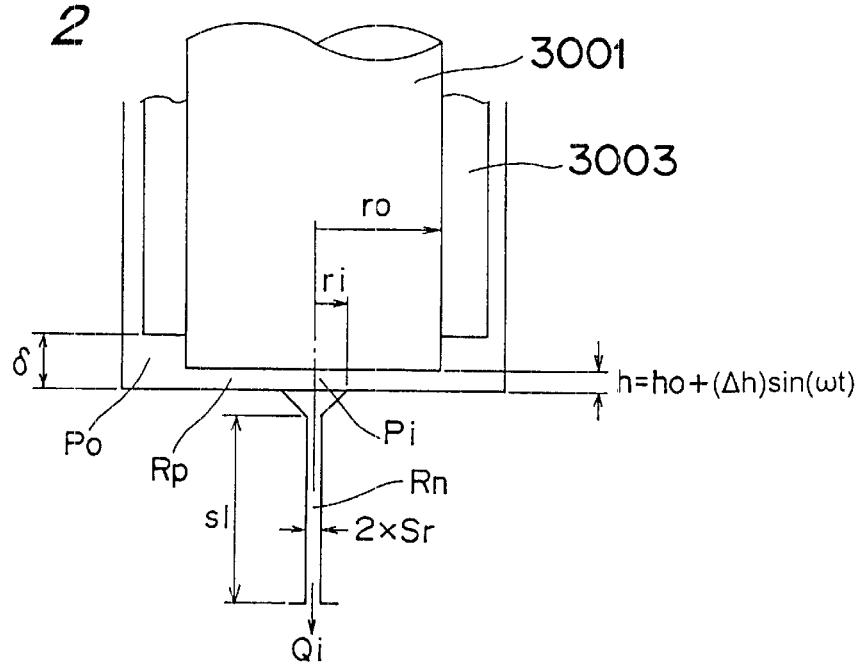
FIG. 2 is a view showing a relationship of dimensions of a squeeze pump.

In the equation (1), "P" represents a pressure, "$\mu$" represents a viscosity coefficient of a fluid, "h" represents a gap between the opposed surfaces, "r" represents a position in the radial direction, and "t" represents time. Furthermore, the right side is a term for producing an effect of the squeeze action generated when the gap changes. FIG. 2 shows a relationship of dimensions of the squeeze pump.

Both sides of the equation (1) are integrated twice assuming the following:

$$\dot{h}=dh/dt$$

A detail procedure for obtaining two undetermined constants from a border condition of the pressure and the flow rate is omitted, but the pressure P at a position r in the radial direction is:

$$P=A+BQ$$

"Q" represents a flow rate of the fluid.

However, $$A = P_0 - \frac{3\mu h}{h^3}\left\{(r_0^2 - r) + 2r_i^2 \ln\frac{r}{r_0}\right\}$$

$$B = \frac{6\mu}{h^3 \Pi} \ln\frac{r}{r_0}$$

"$P_0$" represents a feed pressure source.

In the opening of the discharge nozzle (r=$r_i$: reference numeral 3015 in FIG. 1A), $P_i = A + BQ_i$ is assumed. When the fluid resistance of the discharge nozzle is $R_n$, the flow rate of a fluid passing through the discharge nozzle is obtained by $Q_n = P_i/R_n$. $Q_i = Q_n$ is obtained due to continuity of the flow, and the pressure $p_i$ of the discharge nozzle opening is obtained as follows:

$$P_i = \frac{AR_n}{R_n - B} = \frac{R_n}{R_n + R_p}\left[P_0 - \frac{3\mu h}{h^3}\left\{(r_0^2 - r_i^2) + 2r_i^2 \ln\frac{r_i}{r_0}\right\}\right] \quad (3)$$

When the radius of the discharge nozzle is "sr" and the nozzle length is "sl", the discharge nozzle resistance $R_n$ is as follows:

$$R_n = \frac{8\mu sl}{\pi sr^4} \quad (4)$$

Furthermore, "$R_p$" is fluid resistance between the discharge nozzle opening (reference numeral 3015 in FIG. 1A) and the outer periphery of the piston (the pump chamber end portion 3013 in FIG. 1A).

$$R_p = \frac{6\mu}{h^3 \pi} \ln\frac{r_0}{r_i} \quad (5)$$

The piston end surface and its opposed surface are relatively oscillated (vibrated) so that oscillation (vibration) is applied to the gap between the piston end surface and its opposed surface with $h = h_0 + (\Delta h)\sin(\omega t)$.

In the case of $h_0 \gg \Delta h$, the change component $\Delta P_i$ of the pressure is as follows:

$$\Delta P_i = \frac{-R_n}{R_n + R_p}\left\{(r_0^2 - r_i^2) + 2r_i^2 \ln\frac{r_i}{r_0}\right\}\left(\frac{3\mu(\Delta h)\omega\cos(\omega t)}{h_0^3}\right) \quad (6)$$

When the equation (6) is used, the flow rate due to this pressure change is $\Delta Q = \Delta P_i/R_n$.

Theoretically, the fluid is discharged when the following is obtained:

h<0

However, since it is considered that the actual pressure does not become 0 atmospheric pressure or lower, a discharge section in one period ($0 \leq \theta \leq 2\pi$) is $\pi/2 \leq \theta \leq 3\pi/2$, where $\theta = \omega t$. Therefore, the total discharge amount $Q_s$ per dot is as follows:

$$Q_s = \int_{\pi/2}^{3\pi/2} \Delta Q\, d(\omega t) = \frac{1}{R_n + R_p}\left(\frac{6\mu\Delta h}{h_0^3}\right)\left\{(r_0^2 - r_i^2) + 2r_i^2 \ln\frac{r_i}{r_0}\right\} \quad (7)$$

(2) Analysis Results

Figure 3:
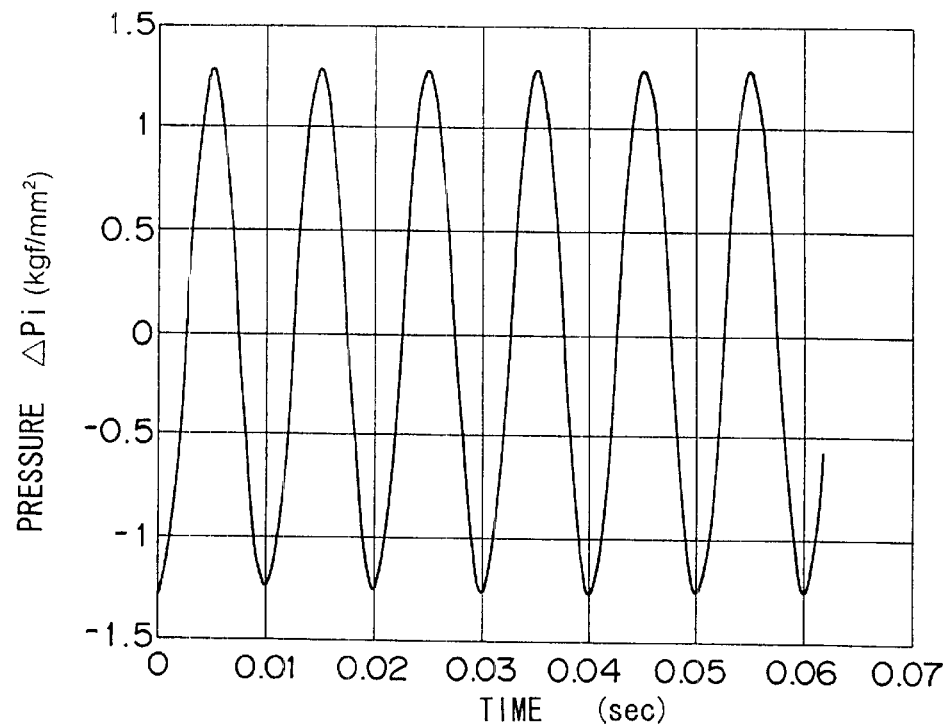
FIG. 3 is a graph of analysis results of a pressure characteristic of a discharge nozzle on the upstream side.
Figure 4:
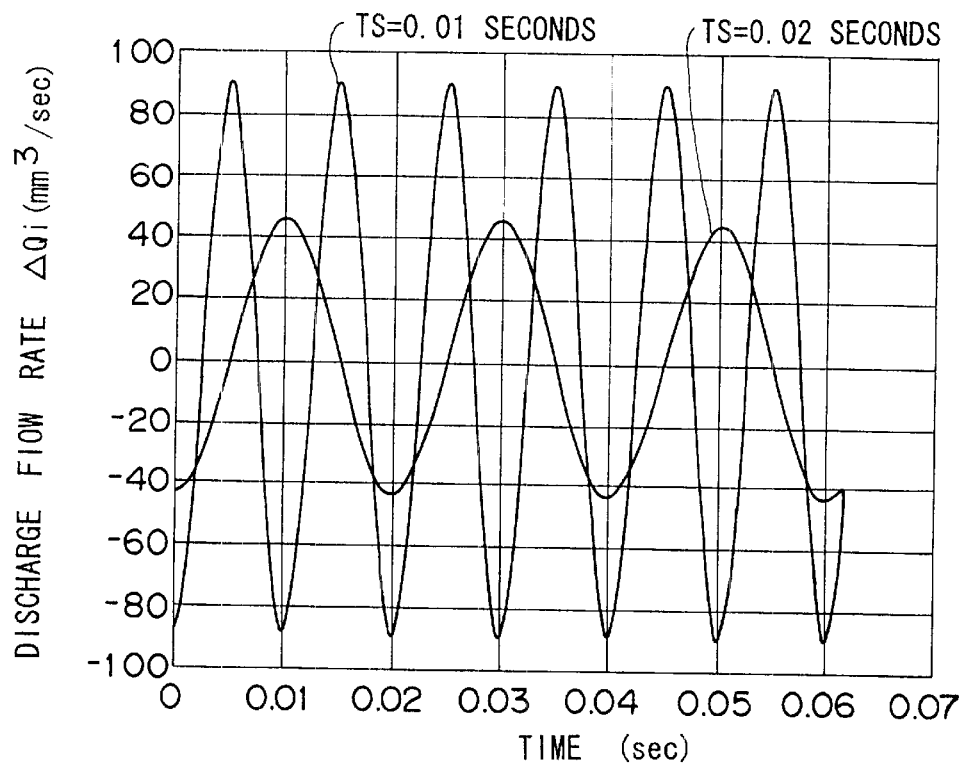
FIG. 4 is a graph of analysis results in comparison of discharge nozzle flow rate characteristics by different periods.

FIGS. 3 and 4 show a pressure characteristic of the discharge nozzle opening (reference numeral 3015 in FIG. 1A) and a flow rate characteristic of the discharge nozzle, respectively, with respect to time obtained under conditions shown in the following Table 1.

The pressure on the upstream side of the discharge nozzle has a steep waveform wherein a high positive pressure and a high negative pressure are alternately repeated. As described above, these pressures are generated due to the squeeze action, which is a kind of dynamic pressure effect of a fluid bearing. The results of a strict numerical analysis show that an extremely high pressure of P=100–200 kg/cm$^2$ is generated between the discharge nozzle upstream side 3015 and the pump chamber end portion 3013 under the conditions according to embodiments of the present invention. In practice, however, since the negative pressure does not become 0 atmospheric pressure ($P_i = -0.01$ kg/mm$^2$) or lower due to occurrence of air bubbles or the like, the reverse flow of the fluid into the discharge nozzle is insignificant. Sharp intermittent coating with a uniform grain size can be achieved by this pressure waveform.

Usually, when a fluid lump (mass) is repeatedly hit on a board while a discharge head and the board are being moved relatively, a negative pressure is generated immediately before the start of coating, a rapidly increased positive pressure is generated immediately after this, and a negative pressure is generated again in this dispenser. Due to this generation of a negative pressure, a fluid at an end of the discharge nozzle is sucked into the nozzle again and separated from the fluid on the board.

That is, extremely sharp intermittent coating can be achieved by a cycle of a negative pressure, rapidly increased positive pressure, and negative pressure.

TABLE 1

| PARAMETER | SYMBOL | SET VALUE |
|---|---|---|
| FLUID VISCOSITY COEFFICIENT | $\mu$ | 9.0 × 10$^{-7}$ kgf · sec/mm$^2$ |
| SUPPLY POWER PRESSURE | $P_{s_0}$ | 1.2 kg/mm$^2$ |
| PISTON RADIUS | $r_0$ | 3.0 mm |
|  | $r_i$ | 1.5 mm |
| CENTRAL POSITION OF OSCILLATION | $h_0$ | 1.5 $\mu$m |
| AMPLITUDE OF OSCILLATION | $\Delta h$ | 5 $\mu$m |
| PERIOD OF OSCILLATION | $T_s$ | 0.01 sec |
| NOZZLE INNER DIAMETER | $s_r$ | 0.18 mm |
| NOZZLE LENGTH | $s_1$ | 6.5 mm |

[2] Characteristics of This Dispenser (1) Relationship of Precision in Discharge Amount With Viscosity and Coating Time (i) Dependence on Viscosity Since the fluid resistances $R_n$, $R_p$ are proportional to the viscosity $\mu$, the viscosity $\mu$ values in a denominator and a numerator are cancelled out in the above equation (7). Therefore, the discharge amount of this dispenser does not depend on viscosity. Usually, the fluid viscosity varies greatly depending on temperature logarithmically. Being insensitive to temperature changes is an extremely advantageous characteristic when a coating system is constructed.

(ii) Dependence on Coating Time

FIG. 4 shows comparison of discharge flow rate characteristics with different periods of dot application. The comparison of the characteristics when periods $T_s$ are 0.01 seconds and 0.02 seconds shows that the total discharge amount $Q_s$ of this dispenser does not depend on coating time. This is because the squeeze generated pressure is proportional to the piston speed. For example, if the coating time is reduced, both the generated pressure and the flow rate increase, and the time integral value of the flow rate becomes invariant.

Figure 5:
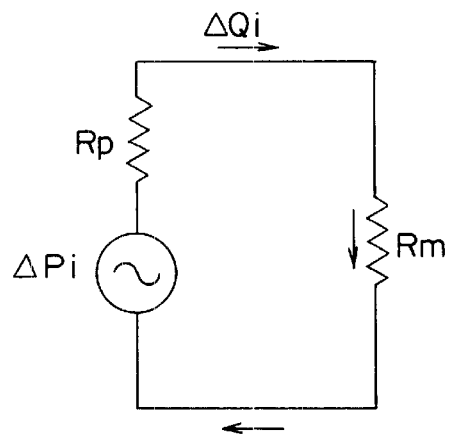
FIG. 5 is a view showing an equivalent electric model of the squeeze pump.

(2) Method for Further Improving Precision in Discharge Amount (i) Equivalent Electric Circuit Model FIG. 5 shows a relationship of the pressure and the load resistance of the squeeze pump expressed by the equation (6) by using an equivalent electric circuit model.

That is, an internal resistance $R_p$ and an external resistance $R_n$ are connected in series by using $\Delta P_s$ as a pressure source. Here, if these resistances can be set to be $R_p \gg R_n$, the equation (7) becomes:

$$Q_s \cong \frac{\pi \Delta h}{\ln\left(\frac{r_0}{r_i}\right)} \left\{ (r_0^2 - r_i^2) + 2r_i^2 \ln\frac{r_i}{r_0} \right\} \quad (8)$$

The total discharge amount $Q_s$ can be determined only by the amplitude $\Delta h$ of the piston from the equation (8) without depending on a gap $h_0$ between the piston end surface and its opposed surface (central position of oscillation) or the discharge nozzle resistance $R_n$.

On the contrary, if the resistances are set to be $R_p \ll R_n$, the equation (7) becomes:

$$Q_s \cong \frac{3\pi s_r^4 \Delta h}{4 s_l h_0^3} \left\{ (r_0^2 - r_i^2) + 2r_i^2 \ln\frac{r_i}{r_0} \right\} \quad (9)$$

It is evident that the total discharge amount $Q_s$ is significantly affected by the gap $h_0$ between the piston end surface and its opposed surface and the discharge nozzle resistance $R_n$ in this case.

Figure 6:
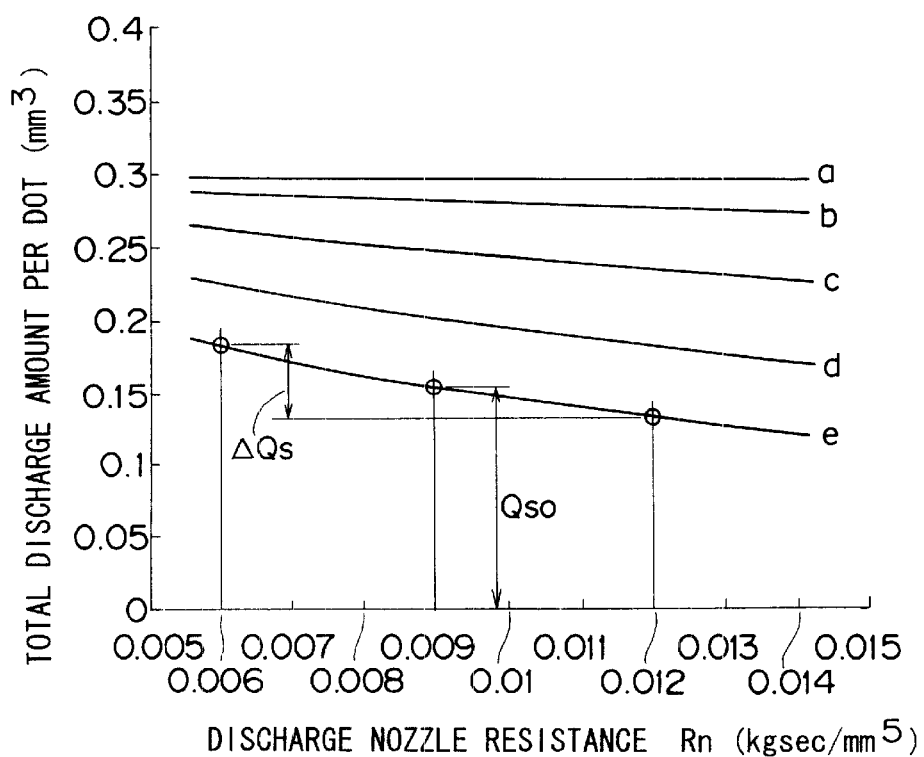
FIG. 6 is a view showing a relationship of the total discharge amount per dot and resistance of the discharge nozzle when internal resistance is used as a parameter.

(ii) Conditions Under Which Total Discharge Amount is Hardly Affected by Change in Discharge Nozzle Resistance FIG. 6 shows a case where relationships of the total discharge amount per dot and the discharge nozzle resistance (a to e in the following Table 2) are obtained by using the internal resistance ($R_p$) of the squeeze pump as a parameter.

TABLE 2

| PARAMETER | $h_0$ ($\mu$m) | $R_p$ (kgf·sec/mm$^5$) | $R_p/R_n$ | CHANGE RATE OF TOTAL DISCHARGE AMOUNT ($\Delta Q_s/Q_{s0}$) × 100(%) |
|---|---|---|---|---|
| a | 10 | 1.19 | 132 | 0.5 |
| b | 20 | 0.14 | 15.6 | 3.4 |
| c | 30 | 4.41 × 10$^{-2}$ | 4.56 | 9.0 |
| d | 40 | 1.86 × 10$^{-2}$ | 2.07 | 21 |
| e | 50 | 9.53 × 10$^{-3}$ | 1.06 | 33 |
| f | 60 | 5.52 × 10$^{-3}$ | 0.61 | 43 |
| g | 70 | 3.47 × 10$^{-3}$ | 0.39 | 50 |

"$R_p$" was set while the gap $h_0$ between the piston end surface and its opposed surface (h=$h_0$ in the equation (5)) is changed.

By using FIG. 6, a change amount $\Delta Q_s$ of the total discharge amount was obtained when the discharge nozzle resistance ($R_n$) is changed from 0.012 to 0.006 kgf·sec/m$^5$. The change rate $\xi$ is further obtained as $\xi=(\Delta Q_s/Q_{s0})\times 100$. It is noted that "$Q_{s0}$" is a value when $R_n$=0.009 kgf·sec/mm$^5$ is assumed. The reduction of the discharge nozzle resistance $R_n$ to half corresponds to a slightly extreme case that the inner diameter of the nozzle increases a little less than 20% since the discharge nozzle resistance is inversely proportional to the fourth power of the inner diameter of the nozzle from the equation (4).

For example, in the case of parameter e, the central value $h_0$ of the piston oscillation is 50 $\mu$m. At this time, the internal resistance $R_p$ of the squeeze pump and the discharge nozzle resistance Rn are of the same order ($R_p/R_n$=1.06), and the change rate $\xi$ of the total discharge amount is obtained as $\xi$=33%.

In the case of parameter "a", $R_p/R_n$=132 is obtained. The change rate is obtained as $\xi$=0.5%, which is insignificant.

(iii) Setting $R_p/R_n$

Figure 7:
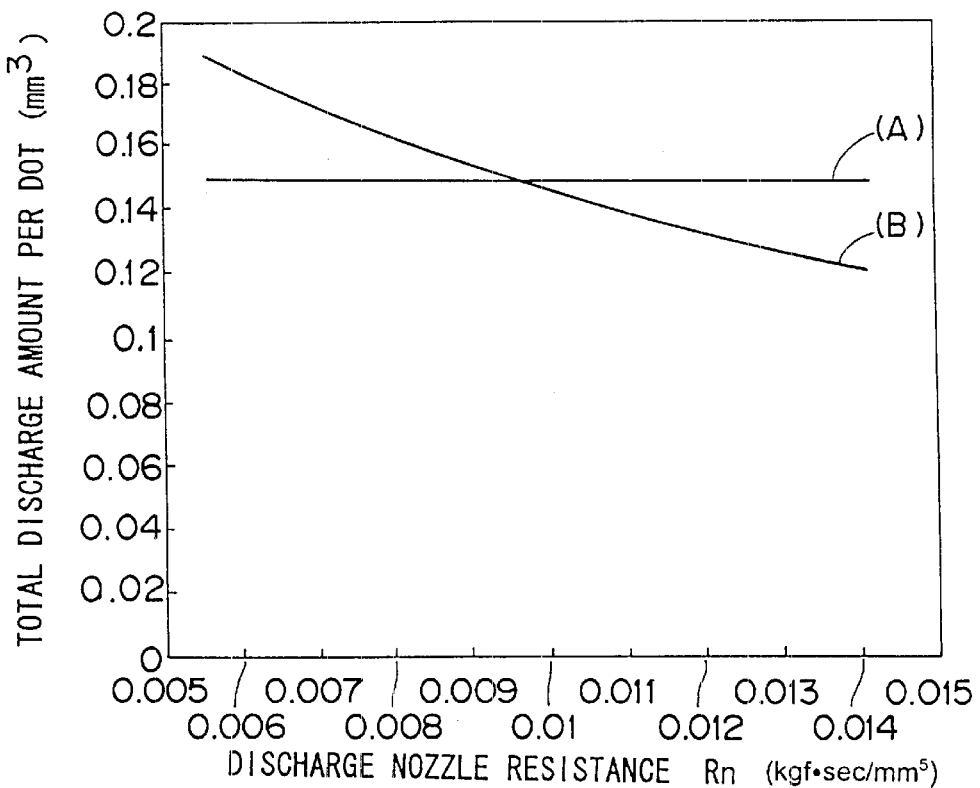
FIG. 7 is a view showing a relationship of the total discharge amount per dot and resistance of the discharge nozzle.

FIG. 7 shows comparison of relationships of the total discharge amount per dot and the discharge nozzle resistance upon coating almost at the same flow rate under conditions shown in the following Table 3.

Superiority of condition (A) over condition (B) is evident. In the case of the condition (A), even when the discharge nozzle resistance changes, the discharge amount is hardly affected and maintained at a constant value.

TABLE 3

| CONDITION | CENTRAL VALUE OF OSCILLATION $h_0$ ($\mu$m) | AMPLITUDE OF PISTON $\Delta h$ ($\mu$m) | $R_p/R_n$ |
|---|---|---|---|
| (A) | 10 | 2.5 | 132 |
| (B) | 50 | 5.0 | 1.06 |

Figure 8:
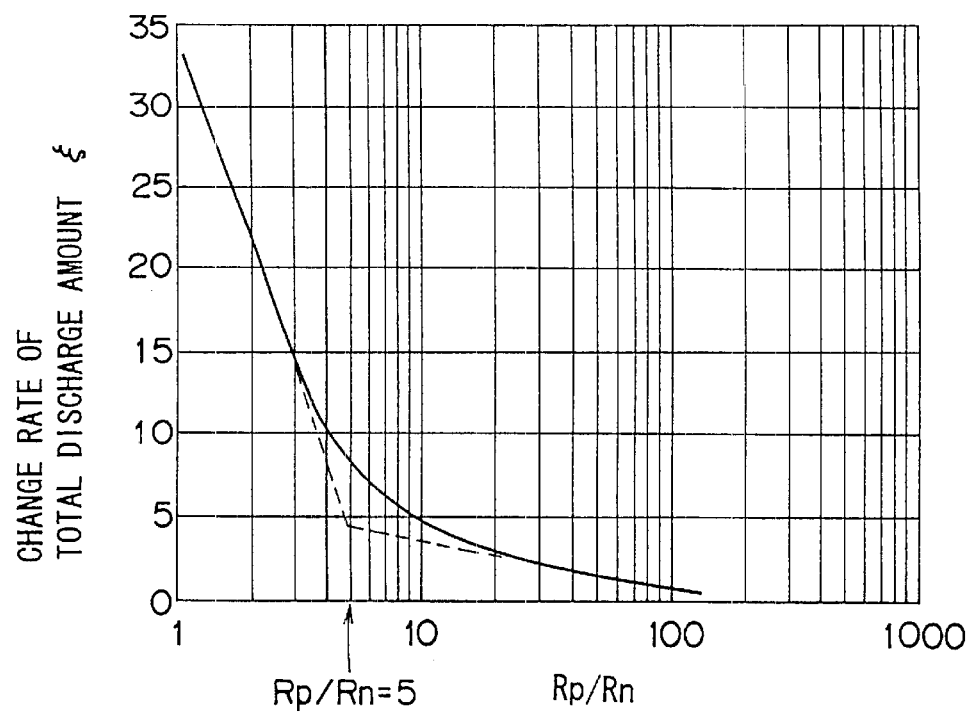
FIG. 8 is a graph showing a relationship of the change rate $\zeta$ of the total discharge amount and $R_p/R_n$.

FIG. 8 summarizes a relationship of the change rate $\xi$ of the total discharge amount and the ratio of the internal resistance and the nozzle resistance $R_p/R_n$ by using Table 2. Since an inflection point where the change rate ? largely lowers is observed in the vicinity of $R_p/R_n \approx$ ?5, only parameters "a" to "e" are shown.

Demonstration experiments were performed under various conditions by using this dispenser.

In a normal process, there are few cases where the discharge nozzle resistance is reduced to half (the inner diameter of the nozzle increases 20%), and it was sufficient to estimate about 20% decrease of the discharge nozzle resistance (the inner diameter of the nozzle increases about 5%). Therefore, the change amount $\Delta Q_s$ of the total discharge amount becomes small, and $\Delta Q_s \rightarrow \Delta Q_s \times (0.009 \times 1.2 - 0.009)/0.006 = \Delta Q_s \times 0.3$ is obtained. In this case, the change rate $\xi$ of the total discharge amount in Table 2 and FIG. 8 can be multiplied by 0.3 for evaluation. About 5% increase of the inner diameter of the nozzle means that the change rate $\xi$ is 21% from equation (10) described later in the case of an air-type dispenser.

In summary, when $R_p/R_n$>0.5 is set in practice, the total discharge amount could be maintained in sufficiently high precision.

Furthermore, it was also found that, when $R_p/R_n$>2 is set, the change rate $\xi$ of the total discharge amount could be further suppressed to a smaller amount with respect to the change in the discharge nozzle resistance.

In a region of less than the inflection point, that is, $R_p/R_n$>5, an almost ideal dispenser can be achieved.

(iv) Difference From Conventional Inkjet-type Dispenser

Figure 21:
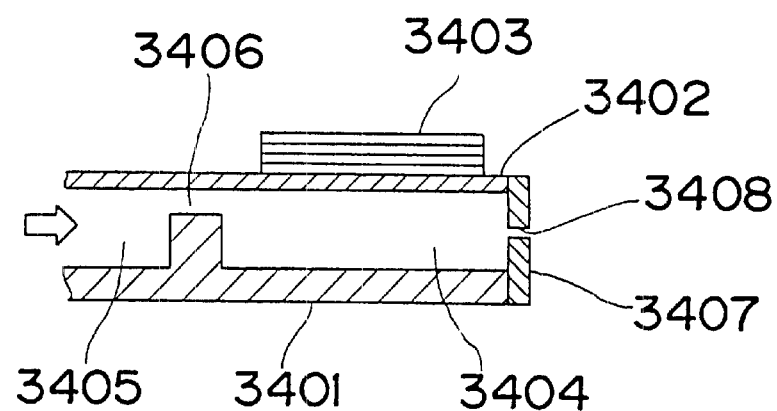
FIG. 21 is a model view showing a conventional inkjet head by a piezoelectric element.

A conventional inkjet-type dispenser (FIG. 21) discharges a fluid by deforming the oscillation plate 3402 to reduce the volume of the ink chamber 3404 by using the laminated piezoelectric element 3403 as an actuator.

Difference from the present invention, wherein a high positive pressure is generated by using a squeeze effect, is evident. For example, in FIG. 21, there is nothing corresponding to fluid resistance other than the discharge nozzle 3408 in the ink chamber 3404, and what corresponds to the internal resistance in the present invention is Rp≈0 (that is, $R_p/R_n \approx 0$).

From the above results of theoretical analysis, various characteristics that are not included in a conventional dispenser became evident. In summary,
(i) The total discharge amount $Q_s$ per dot is proportional to the oscillation amplitude $\Delta h$ of the piston.
(ii) The total discharge amount $Q_s$ is not affected by viscosity of a coating fluid or coating time.
(iii) The total discharge amount $Q_s$ can be set so as not to be affected by discharge nozzle resistance or a gap between the piston end surface and its opposed surface (central absolute position $h_0$ of oscillation).

That the total discharge amount $Q_s$ per dot is not affected by fluid viscosity largely depending on temperature, and can be controlled only by an output value of the oscillation amplitude of a displacement sensor is a characteristic which is not included in a conventional type of this dispenser.

Furthermore, that the total discharge amount $Q_s$ can be set so as not to be affected by discharge nozzle resistance is a characteristic obtained because a dispenser using this coating method utilizing the squeeze effect has a "fixed displacement pump characteristic". The reason why the dispenser can be used as a fixed displacement pump is that this dispenser has two surfaces that relatively move (that is, oscillate or vibrate) in the gap direction while keeping the gap narrow (squeeze pump portion 3014) in the flow path, and that this portion serves as a pressure generating source and large internal resistance $R_p$ of the flow passage connected to the discharge nozzle.

This large internal resistance $R_p$ also serves as an effect of a "non-return valve" for preventing a back flow into the suction side.

Meanwhile, the discharge nozzle resistance $R_n$ varies depending on a gap between the discharge nozzle end and the coating surface. If the coating surface has a swell, a dispenser whose discharge amount is easily affected by the discharge nozzle resistance $R_n$ has more variations in the discharge amount.

It is noted that the total discharge amount $Q_s$ per dot of a conventional air-type dispenser is obtained from the following equation.

$$Q_s \cong \frac{P_{s0} \pi \cdot s_r^4 \Delta t}{8\mu \cdot s_l} \quad (10)$$

In the equation (10), "Ps0" represents a feed source pressure. "$s_r$" represents a radius of the discharge nozzle. "$s_t$" represents a nozzle length. "$\Delta t$" represents time. "$\mu$" represents a viscosity coefficient of the coating fluid.

Comparison of the equations (10) and (8) reveals superiority of the dispenser of the present invention. In the case of the air-type dispenser, the total discharge amount $Q_s$ is affected by the feed source pressure Ps0, change in viscosity $\mu$, and coating time $\Delta t$. Therefore, in the case of the air-type dispenser, strict control of temperature and coating time $\Delta t$ is required to keep the viscosity constant.

Furthermore, for example, when a fluorescent surface such as PDP, CRT, or the like is coated with a fluorescent substance, and fine powder passes through the discharge nozzle, the inner surface of the nozzle is worn away, thereby increasing the inner diameter of the nozzle after a long-term use. When a conventional air-type dispenser is used, since nozzle resistance is proportional to the fourth power of the inner diameter of the nozzle, there are problems that the small increase of the inner diameter significantly affects the discharge flow rate and the like. This problem is overcome by application of the dispenser of the present invention.

(3) Conditions for Stabilizing Discharge Amount

When n dots per second are applied onto an opposed surface by using this dispenser, the mean discharge flow rate $Q_{sm}$ is as follows:

$$Q_{sm} = \frac{n}{R_n + R_p}\left(\frac{6\mu\Delta h}{h_0^3}\right)\left\{(r_0^2 - r_i^2) + 2r_i^2 \ln\frac{r_1}{r_0}\right\} \quad (11)$$

The fluid feed source side of this dispenser needs to feed a fluid to the squeeze pump side so as to compensate for the discharge amount released to tile outside. In a macro view, a fluid passing through the flow passage of this dispenser flows in one direction towards the discharge nozzle 3010. If the flow rate from the feed source side is insufficient, the fluid is not filled in a gap between the piston end surface and its opposed surface (squeeze pump portion 3014), and the squeeze pump performs no fluid application (stroke).

Figure 9:
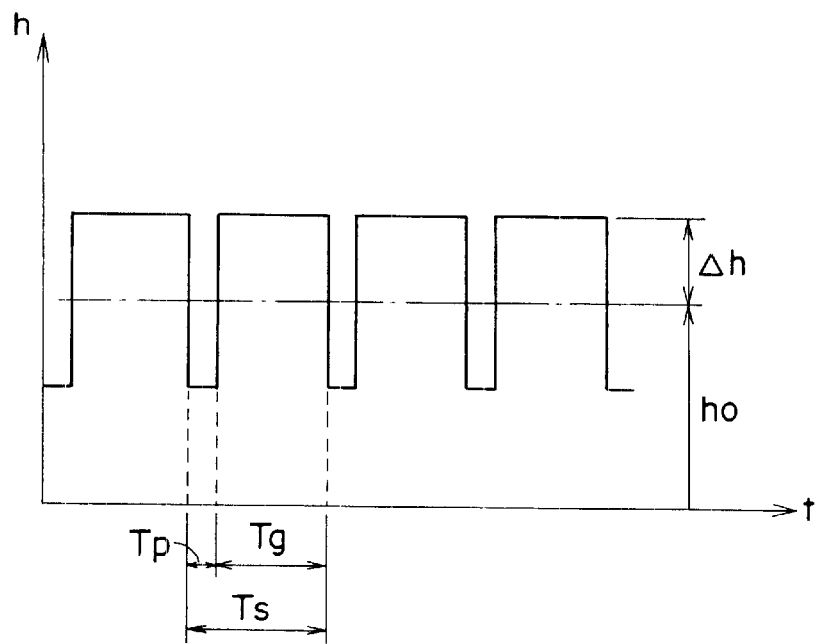
FIG. 9 is a view showing an example of piston displacement with respect to time.

FIG. 9 shows an example of a piston displacement curve with respect to time. When a piezoelectric element is used for a drive of the piston in the axial direction, a drive by a pulsed waveform as shown in FIG. 9 is possible by making the most of its favorable response. Here, time when the piston is at a position where the piston is lowered is $T_p$, and time when the position is at a position where the piston is raised is $T_g$.

It is assumed that one cycle period is $T_s$ ($=T_p+T_g$), a duty ratio is $\phi=T_g/T_s$, and the maximum transportation amount of a screw groove pump, which is one example of a "fluid feed device", is $Q_{gmax}$. The mean flow rate that can be achieved by the screw groove pump is $Q_{gmax} \times \phi$. Therefore, a requirement for this dispenser to ideally function without no-fluid application without a fluid is as follows:

$$Q_{g\max} > \frac{1}{\varphi} Q_{sm} \quad (12)$$

It is evident from the equation (12) that as the duty ratio f is larger, the maximum transportation amount $Q_{gmax}$ of the screw groove pump can be made smaller.

However, the result of the experiments showed that a satisfactory function as a dispenser could be obtained even though the above equation (12) was not necessarily satisfied. In this case, a linear relationship that the mean discharge flow rate $Q_{sm}$ or the total discharge amount $Q_s$ per dot is proportional to the piston amplitude $\Delta h$ and the number n of coating times per unit time is not established. That is, delicate control where the coating amount is adjusted while changing the amplitude $\Delta h$ and the number n of coating becomes difficult.

However, in the case of a coating process under a fixed condition that the coating amount was constant, satisfactory coating was possible when the required flow rate was set to be about 20% of the ideal amount, that is $Q_{gmax}>(0.2 \times Q_{sm}/\phi)$ is set.

Figure 10:
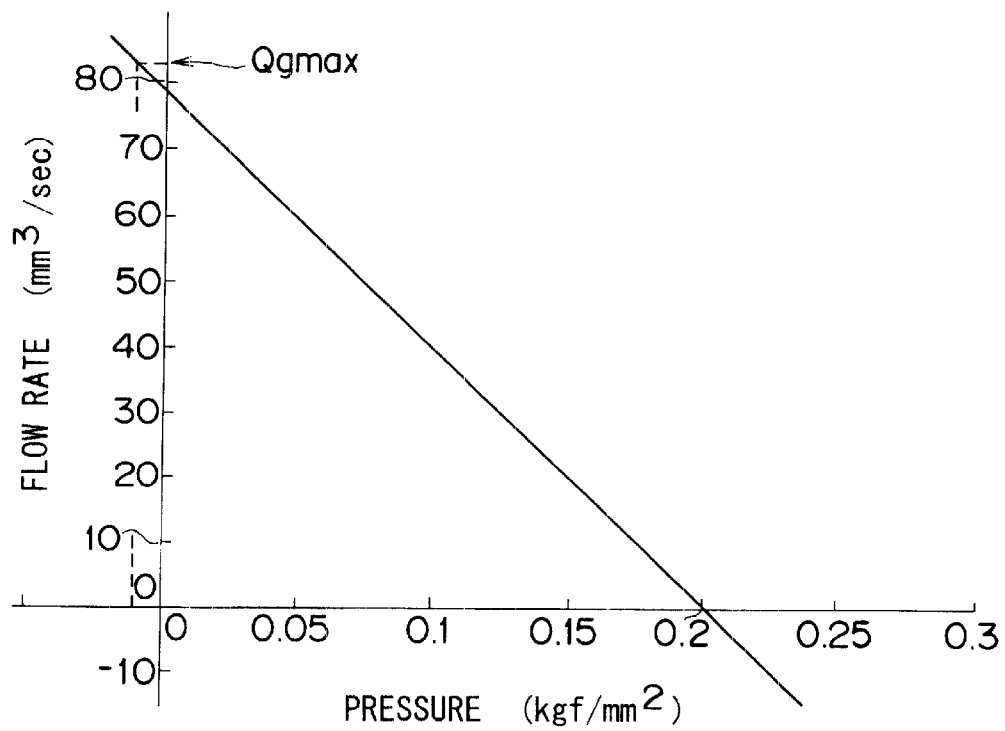
FIG. 10 is a view showing a relationship of the flow rate and pressure of a screw groove pump.

FIG. 10 is a graph showing a relationship of the flow rate and a pressure of the screw groove pump obtained under conditions in the following Table 4.

TABLE 4

| PARAMETER | SYMBOL | SPECIFICATION |
|---|---|---|
| NUMBER OF ROTATIONS | N | 400 rpm |
| SHAFT DIAMETER | D | 6 mm |
| GROOVE DEPTH | $h_g$ | 1.4 mm |
| GAP | deltaR | 25.0 $\mu$m |

TABLE 4-continued

| PARAMETER | SYMBOL | SPECIFICATION |
|---|---|---|
| GROOVE WIDTH | $b_g$ | 2.0 mm |
| PUMP LENGTH | B | 15.5 mm |
| GROOVE ANGLE | alfad | 15 deg |

Here, the pressure is defined as a differential pressure ($=P_2-P_1$) of a pressure $P_2$ ($=P_0$) of the lower end portion 3013 of the screw groove pump and a pressure $P_1$ in the vicinity of the suction port 3007. When the screw groove pump transports a fluid at the highest flow rate, the differential pressure is the lowest, that is the piston 3001 rises and the pressure at the lower end portion 3013 of the screw groove 3006 is 0 atmospheric pressure ($P_2=-0.01$ kg/mm$^2$). Therefore, the maximum transportation amount $Q_{gmax}$ of the pump is, for example, 83 mm$^3$/sec, which is a flow rate with $P=-0.01$ kg/mm$^2$ in a graph in FIG. 10.

As the form of a pump as one example of the fluid feed device in the present invention, pumps of not only the screw groove type, but of other types can be applied. For example, pumps of Mohno type called a snake pump, gear type, twin-screw type, syringe type, and so forth can be applied. Alternatively, a pump where a fluid is pressurized by a high-pressure air may be used. That is, when only a low discharge flow rate is required, a device for rotating a sleeve is unnecessary and the sleeve can also be omitted so long as there is provided a device for feeding the fluid to the pump chamber.

Usually, the maximum transportation amount $Q_{gmax}$ of a pump can be obtained theoretically in many cases, but, if this is difficult, pressure and flow rate characteristics corresponding to the graph in FIG. 10 may be obtained experimentally.

(4) Conditions for Maximizing Discharge Pressure and Flow Rate

The above analysis results were obtained when the mean diameter of the discharge port opening is constant ($r_i=1.5$ mm). Hereafter, discussion will be based on the fundamental equation (7) for obtaining the total discharge amount $Q_s$ per dot drawn from the Reynolds equation (1) again. As described above, when the relationship of the pressure and the load resistance of the squeeze pump is shown by an equivalent electric circuit model (FIG. 5), the relationship is shown by such a form that the internal resistance $R_p$ and the external resistance $R_n$ are connected in series with $\Delta P_i$ as a pressure generation source. That is, $Q_i=\Delta P_i/(R_p+R_n)$ is obtained. If the mean radius $r_i$ of the discharge port opening is reduced towards 0, not only the pressure generation source $\Delta P_i$ but also the internal resistance $R_p$ increases to suppress the flow rate. That is, existence of an optimum ratio of inner and outer diameters $r_i/r_o$ of a piston, which maximizes the total discharge amount $Q_s$, is expected.

Figure 11:
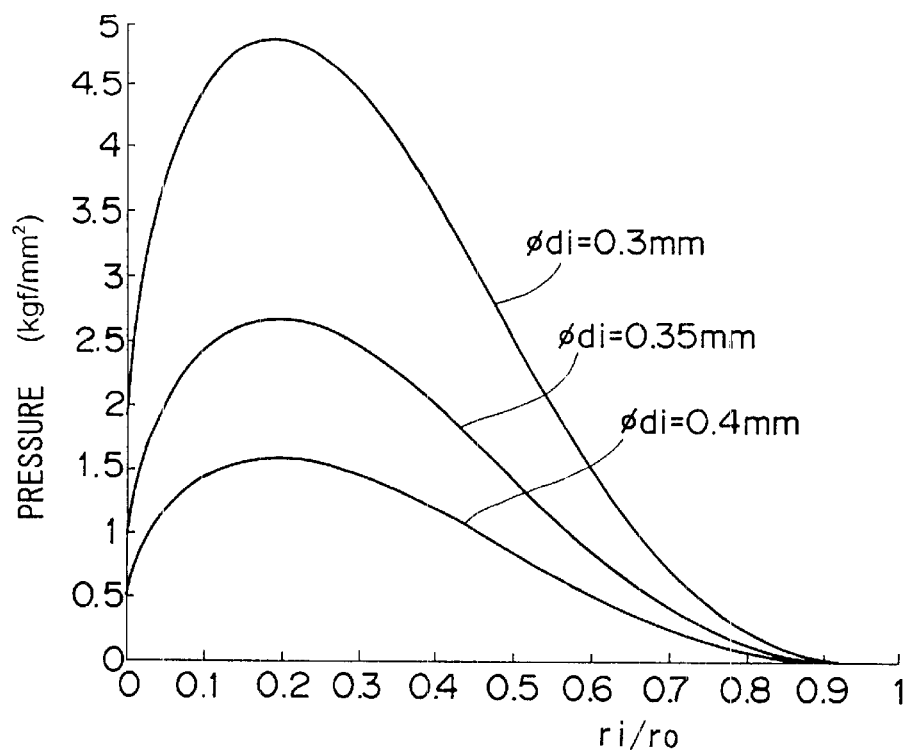
FIG. 11 is a graph showing a relationship of a pressure and $r_i/r_0$.

FIG. 11 shows a case where discharge pressures $|\Delta P_i|$ with respect to $r_i/r_o$ is obtained under the conditions shown in Table 1 by using the internal diameter $r_i$ of the discharge nozzle as a parameter. It is evident that the amplitude of the discharge pressure $|\Delta P_i|$ has the maximum value in the vicinity of $r_i/r_o=0.2$.

Figure 12:
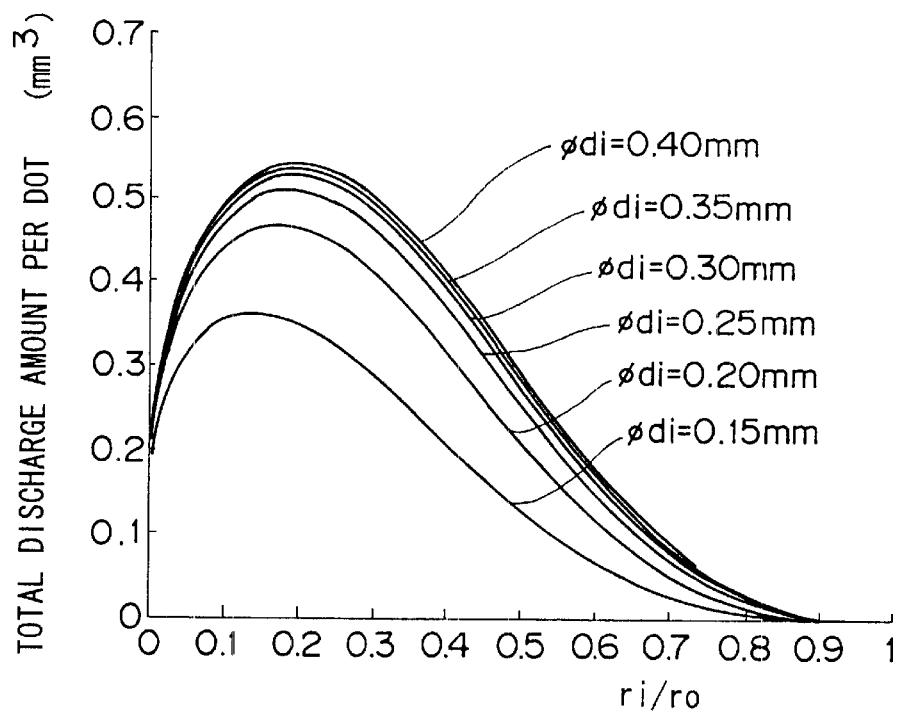
FIG. 12 is a graph showing a relationship of a flow rate and $r_i/r_0$.

FIG. 12 shows the total discharge amount $Q_s$ per dot similarly obtained by using the internal diameter $d_i$ ($=2\times r_i$) of the discharge nozzle as a parameter. The total discharge amount $Q_s$ has the maximum value in the range of $0.1<r_i/r_o\leq0.2$. However, when the internal diameter of the discharge nozzle is $d_i\geq0.3$ mm, the $Q_s$ value hardly varies. This is because the discharge nozzle resistance $R_n$ determined by the internal diameter $d_i$ of the discharge nozzle is sufficiently small compared with the internal resistance $R_p$, and the change rate $\xi$ of the total discharge amount $Q_s$ becomes insignificant. When $d_i\leq0.25$ is set, tile total discharge amount $Q_s$ is largely reduced since this deviates from the condition for maintaining high flow rate precision in response to the discharge resistance change, that is $R_p\geq R_n$.

However, in any case, a sufficiently high flow rate can be obtained when $r_i$ and $r_0$ are set in the range of $0.1<r_i/r_0<0.3$.

(5) Supplemental Remarks

The fluid resistances $R_p$, $R_n$ are usually obtained from well-known theoretical equations (for example, equations (4) and (5)), but may be obtained by using numerical analysis or by experiments when the shape is complicated. When an orifice whose throttle portion length is shorter than the internal diameter is used, a linear resistance equation (for example, equation (4)) is not established, but, in this case, the resistance is linearized by using an operating point as a center and used as dummy fluid resistance.

The shapes of a piston and its opposed surface constituting a squeeze pump do not have to be circular. If the present invention is applied as an inkjet printer, the shape of the piston may be rectangular. In this case, the radius of a circle having an equivalent area is the mean radius.

In the pump of this embodiment, which handles a very small amount, the stroke of the piston may be of the order of a few tens of microns at the largest, and the limit of the stroke is not a problem even when an electro-magnetostrictive element such as giant-magnetostrictive element or a piezoelectric element is used.

Furthermore, when a high-viscosity fluid is discharged, occurrence of a high discharge pressure is expected due to a squeeze action. In this case, since a large thrust against a high fluid pressure is required in the axial direction drive device for driving the piston, application of an electro-magnetostrictive actuator that can readily output a force of several hundred to several thousand N is preferred. Since the electro-magnetostrictive element has a frequency response of several MHz or higher, the piston can be moved linearly with a high response. Therefore, the discharge amount of the high-viscosity fluid can be controlled with high response and in high precision.

As shown in the equation (6), FIG. 2, and the graph in FIG. 3, the generated pressure and the flow rate due to the squeeze effect have waveforms whose phase is $\Delta\theta=\pi/2$ ahead with respect to the displacement input of the gap between the piston end surface and its opposed surface $h=h_0+(\Delta h)\sin(\omega t)$. That is, the fluid is discharged in a section ($dh/dt<0$) while the piston in being lowered. For example, when a board to be coated is intermittently coated while moved by using a stage, in order to perform the coating in high position precision while aiming at a site to be coated, timing of the stage and the displacement input signal h has only to be matched to coat the board, considering that the coating is performed with the phase $\Delta\theta=\pi/2$ ahead the displacement input signal h of the piston gap. For example, it is sufficient that the stage is moved while the piston is being raised, and when the target board is stopped, the piston is lowered to coat the target board.

Figure 1B:
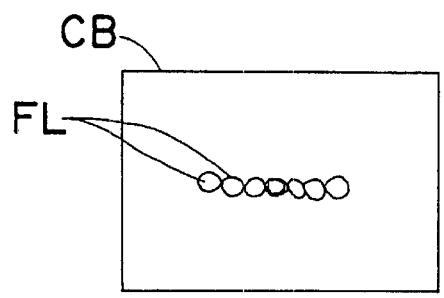
FIG. 1B is an explanatory view of a fluid discharged state of the dispenser according to the first embodiment of the present invention.

As the piston is driven in a higher frequency, the intermittent coating becomes closer to continuous coating infinitely as shown in FIG. 1B where CB represents a circuit board and FL represents fluid. In this case, when the number of coating, per unit time is n (1/sec), the mean discharge amount $Q_{sm}$ can be controlled by setting the number n of coating by the equation (11).

Furthermore, when a long pipe having a small diameter is attached on the discharge side and its end is provided with a discharge nozzle as a time delay element, pseudo continuous coating shown in FIG. 1B is possible even in a further low frequency.

In the embodiment, the sleeve 3003 is made rotatable, and the piston 3001 is made movable in the axial direction. As in the existing proposal (Japanese Patent Application No. 2000-188899)(Unexamined Japanese Patent Publication No. 2002-1192), the present invention may be applied in a composite actuator structure using a rotary motion and a linear motion by a motor and a giant-magnetostrictive element by forming the sleeve and the piston integrally. The findings (that is, invention or discovery) in the theoretical analysis disclosed by the present invention are not mentioned in the existing proposal.

Figure 13A:
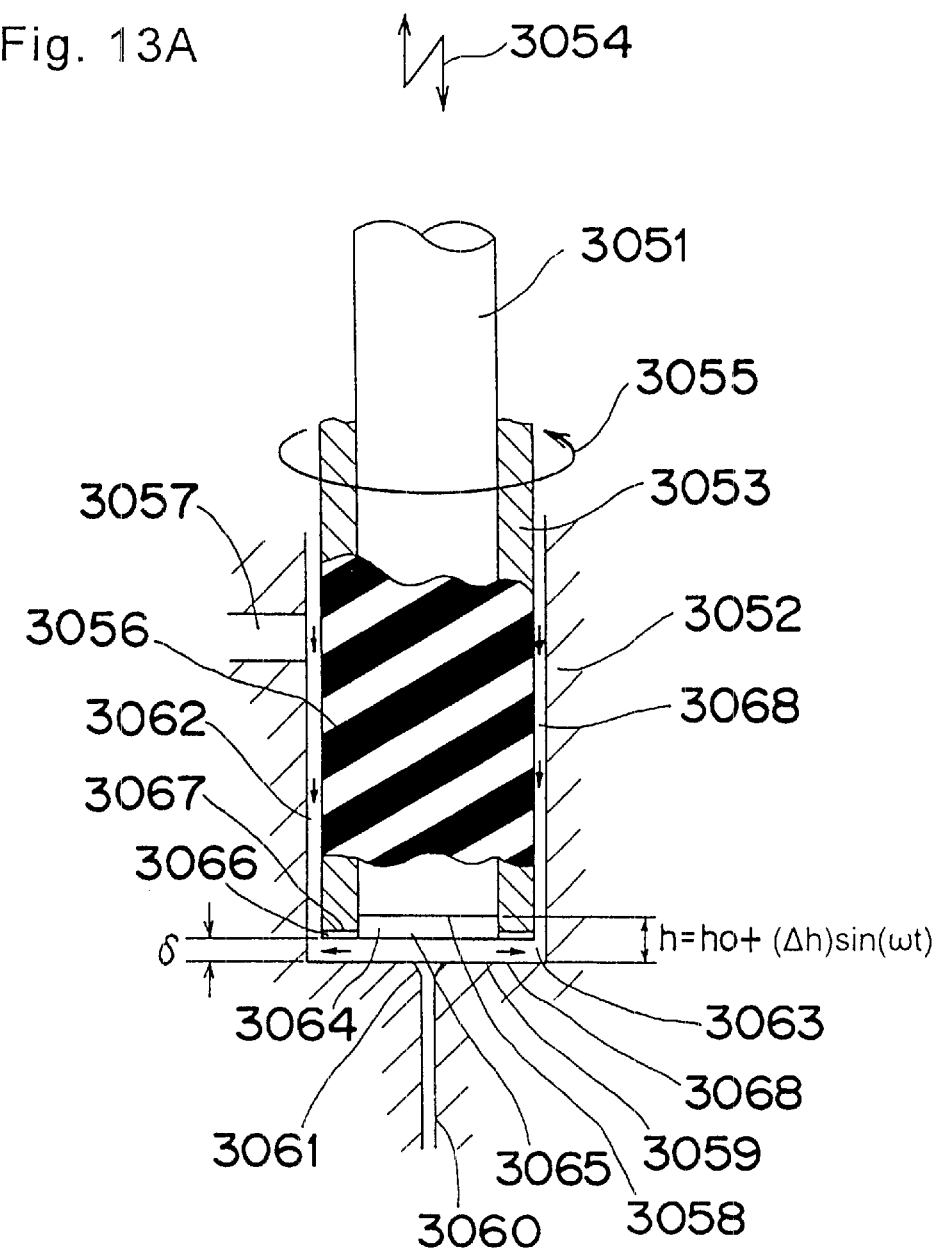
FIG. 13A is a front cross sectional view of a second embodiment of the present invention.
Figure 13B:
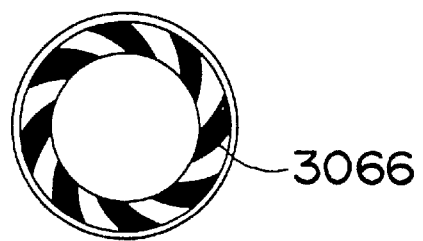
FIG. 13B is a view showing an end surface of the second embodiment.

FIGS. 13A and 13B show a second embodiment of the present invention. By forming a dynamic pressure seal between the sleeve end surface on the discharge side and its opposed surface, which are relatively moved surfaces, an outflow of a fluid from a discharge nozzle is blocked in a state that intermittent coating is not performed, that is, a state that a piston is stopped.

In FIG. 13A, reference numeral 3051 denotes a piston, reference numeral 3052 denotes a housing, and reference numeral 3053 denotes a sleeve. As in the case of the first embodiment, the piston 3051 and the sleeve 3053 are similarly driven by an axial direction drive device (for driving reciprocal and axial movement shown by an arrow 3054) and a rotation transmitting means (for driving rotation shown by an arrow 3055), respectively. Reference numeral 3056 denotes a screw groove, and reference numeral 3057 is a suction port of a fluid. Reference numeral 3058 denotes an end surface of the piston 3051, and reference numeral 3059 denotes its opposed surface on the fixed side, that is, a bottom surface of the housing 3002 facing a housing chamber in the housing 3002. Reference numeral 3060 denotes a discharge nozzle and reference numeral 3061 denotes an opening of the discharge nozzle 3060. Reference numeral 3062 denotes a coating fluid and reference numeral 3063 denotes a pump chamber end portion. Reference numeral 3064 denotes a squeeze pump. The portion positioned at reference numeral 3065 is the upstream side of the discharge nozzle 3060. A gap portion formed by the screw groove 3056 and the housing 3052 constitutes a pump chamber 3068.

In FIG. 13B, reference numeral 3066 is a thrust dynamic pressure seal (the black solid portion is a groove) formed between the discharge side end surface 3067 of the sleeve 3053 and its opposed surface 3068, which are relatively moved surfaces. The gap δ between the discharge side end surface 3067 of the sleeve and its opposed surface 3068 is sufficiently narrow and is set to be δ=20 μm in this embodiment. A pumping pressure for forcefully feeding a fluid in a centrifugal direction at all times is generated between the discharge side-end surface 3067 of the sleeve and its opposed surface due to this thrust dynamic pressure seal 3066.

TABLE 5

| PARAMETER | SYMBOL | SET VALUE |
|---|---|---|
| NUMBER OF ROTATIONS | N | 400 rpm |
| GROOVE DEPTH | $h_g$ | 20 μm |
| RADIUS | $r_o$ | 5.0 mm |
|  | $r_i$ | 3.0 mm |
| GROOVE ANGLE | α | 3.0 deg |
| GROOVE WIDTH | $b_g$ | 0.5 mm |
| RIDGE WIDTH | $b_r$ | 1.5 mm |

(1) State That Intermittent Coating is Off

In this case, the sleeve 3053 maintains a rotation state, while the piston 3051 is stopped (h=$h_0$). At this time, a fluid in the pump chamber end portion 3063 receives forceful feed action towards the discharge side from the screw groove 3056. However, since a pumping pressure for forcibly feeding the fluid in the centrifugal direction is also generated between the discharge side-end surface 3067 of the sleeve 3053 and its opposed surface 3068 by the thrust dynamic pressure seal 3066, an outflow of the fluid to the discharge nozzle 3060 side is blocked.

Figure 14A:
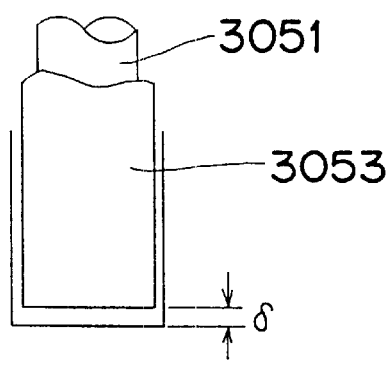
FIG. 14A is a view showing a relationship of a pressure of a thrust dynamic pressure seal in the second embodiment and the gap.
Figure 14A:
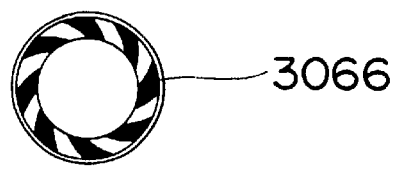
Figure 14B:
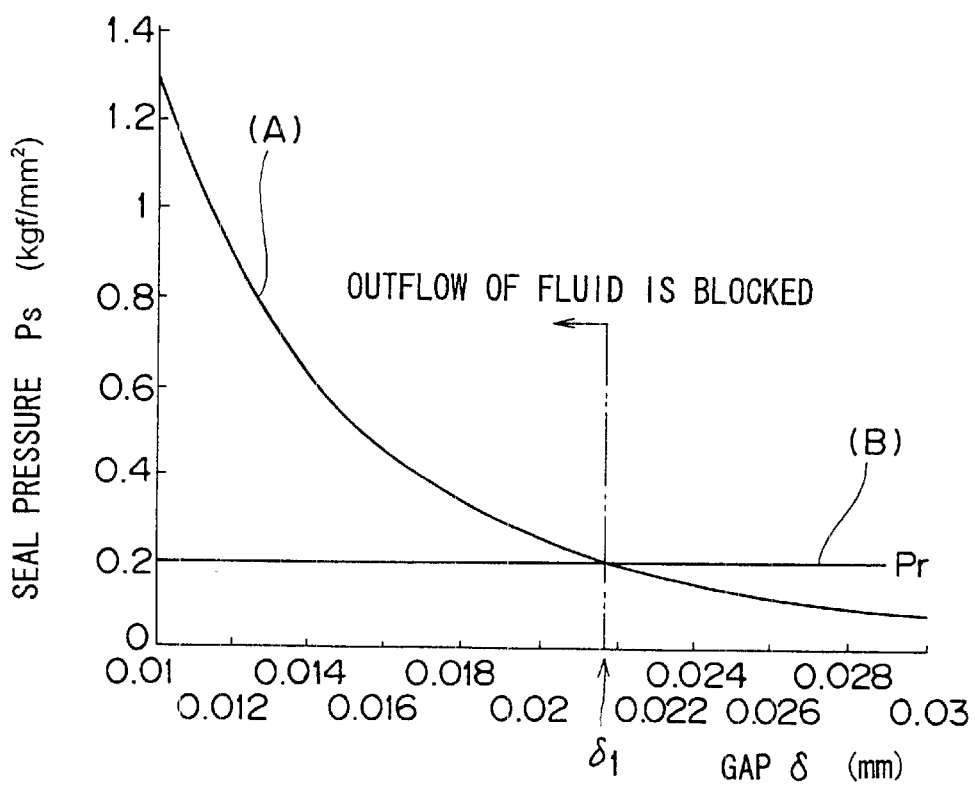
FIG. 14B is a graph showing this relationship.

A curve (A) in FIG. 14B shows one example of a relationship of the seal pressure of the thrust dynamic seal and the gap under the conditions shown in the above Table 5.

This characteristic can be arbitrarily selected depending on the outer diameter of the thrust surface, groove depth, spiral angle, ratio of the groove and ridge, number of rotations, viscosity, and so forth. In the embodiment, when the gap δ=20 μm, the above parameters were set so that a seal pressure of $P_s$=0.2 kg/mm² (see line (B) in FIG. 14B) or higher is generated.

Meanwhile, as described above, the relationship between the pressure and the flow rate of the screw groove pump can be selected by similar parameters. In the embodiment, when the transportation amount is $Q_g$=0, the groove shape, outer diameter, and so forth were set so that a generated pressure is $P_r$=0.2 kg/mm². Therefore, while the piston 3051 is stopped, discharge of the fluid is blocked.

(2) State That Intermittent Coating is On

The piston end surface and its opposed surface are relatively oscillated (vibrated) so that oscillation (vibration) is applied to the gap between the piston end surface and its opposed surface with, for example, h=$h_0$+(Δh)sin(ωt). Then, an extremely high positive pressure and negative pressure are alternately generated in the squeeze pump 3064 as described above. At the time of generation of a negative pressure, that is, when the volume of the squeeze pump 3064 increases, the thrust dynamic seal 3066 adjacent to the squeeze pump 3064 becomes ineffective, and the pressure of the seal portion 3066 significantly lowers.

As a result, the fluid flows into the squeeze pump 3064 via the seal portion 3066 due to the pumping action of the screw groove 3056. That is, in a section of dh/dt>0, where the piston 3051 is raised, a fluid is fed from the screw groove, which serves as a fluid feed device. In a section of dh/dt<0, where the piston 3051 is lowered, a fluid is discharged due to a squeeze pressure much higher than the pressure of the dynamic seal or the screw groove pump.

(3) When Coating State is Transited From On to Off or Off to On

Since the squeeze pressure and the pressure (venerated by the dynamic pressure seal do not basically have time delay elements, the discharged fluid is promptly blocked or the discharge is started.

Furthermore, since the fluid in the vicinity of the opening of the discharge nozzle 3060 receives a pumping action in the centrifugal direction from the thrust dynamic pressure seal 3066, the fluid is at a negative pressure (atmospheric pressure or lower). Due to this effect, the fluid remaining at the end of the discharge nozzle 3060 is sucked into the pump again. As a result, a fluid lump due to surface tension is not formed at the end of the discharge nozzle 3060, and a thread or hanging does not occur.

The second embodiment of the present invention has been explained so far. The fundamental equation of the squeeze pump drawn in the first embodiment and the findings (that is, invention or discovery) obtained from its theoretical analysis results can be applied in both this embodiment and other embodiments described later as they are.

Furthermore, the difference between this embodiment and the existing proposal (Japanese Patent Application No. 2000-188899)(Unexamined Japanese Patent Publication No. 2002-1192) is that the sleeve 3053 provided with the thrust dynamic pressure seal 3066 is not moved in the axial direction, and that the gap between the dynamic pressure seal 3066 and its opposed surface is constant at all times. This embodiment utilizes a characteristic that the squeeze pump can generate a much higher pressure than the pressure generated by the dynamic pressure seal. Only when the piston is moving, the "pressure equilibrium condition" of the dynamic pressure seal and the screw groove pump is violated, and the fluid is discharged.

The fluid resistance $R_p$ in this embodiment represents fluid resistance between the discharge nozzle opening 3061 and the pump chamber end portion 3063, which is the outer periphery of the thrust dynamic pressure seal (outer periphery of relatively moved surfaces). Thus, when a narrow gap ($\delta=20$ μm in this embodiment) is disposed in the flow passage from the pump chamber through the discharge nozzle opening, resistance obtained by adding fluid resistance $R_{p2}$ of the narrow flow passage to fluid resistance $R_{p1}$ of the piston end surface is defined as the fluid resistance $R_p$ ($=R_{p1}+R_{p2}$). In this case, in order to obtain high $R_p$ for the purpose of ensuring discharge amount precision, the gap between the piston end surface and its opposed surface does not need to be narrowed when the fluid resistance $R_{p2}$ of the thrust dynamic pressure seal portion is sufficiently high.

It is true of the case of a radial dynamic pressure seal described later, and fluid resistance of the radial dynamic pressure seal is defined as $R_{p2}$. Furthermore, when the screw groove pump, which serves as a fluid feed device, itself has large internal resistance, the fluid resistance $R_p$ can be obtained similarly by adding the internal resistance of the screw groove pump thereto.

Since the piston 3051 does not need to perform composite motions of linear motions and rotary motions, electric power does not need to be supplied to a rotating member. Therefore, a piezoelectric actuator or the like is provided on the fixed side to drive the piston 3051. As a result, the whole constitution of the dispenser main body can be simplified.

Furthermore, at the time of coating with powder fluid such as a fluorescent substance or adhesive material containing fine particles, the minimum value $\delta_{min}$ of the gap $\delta$ can be set to be larger than the fine particle diameter $\phi d$.

$$\delta_{min} > \phi d \tag{13}$$

In order to obtain a larger gap for the same generated pressure, the number of rotations can be increased or the radius of the thrust groove 3066 can be increased and appropriate values can be selected for the groove depth, groove angle, and so forth. As the thrust dynamic pressure groove, in addition to the spiral-shaped groove shown in FIG. 1B, for example, a groove called herring bone (fish bone) may be used.

Figure 15:
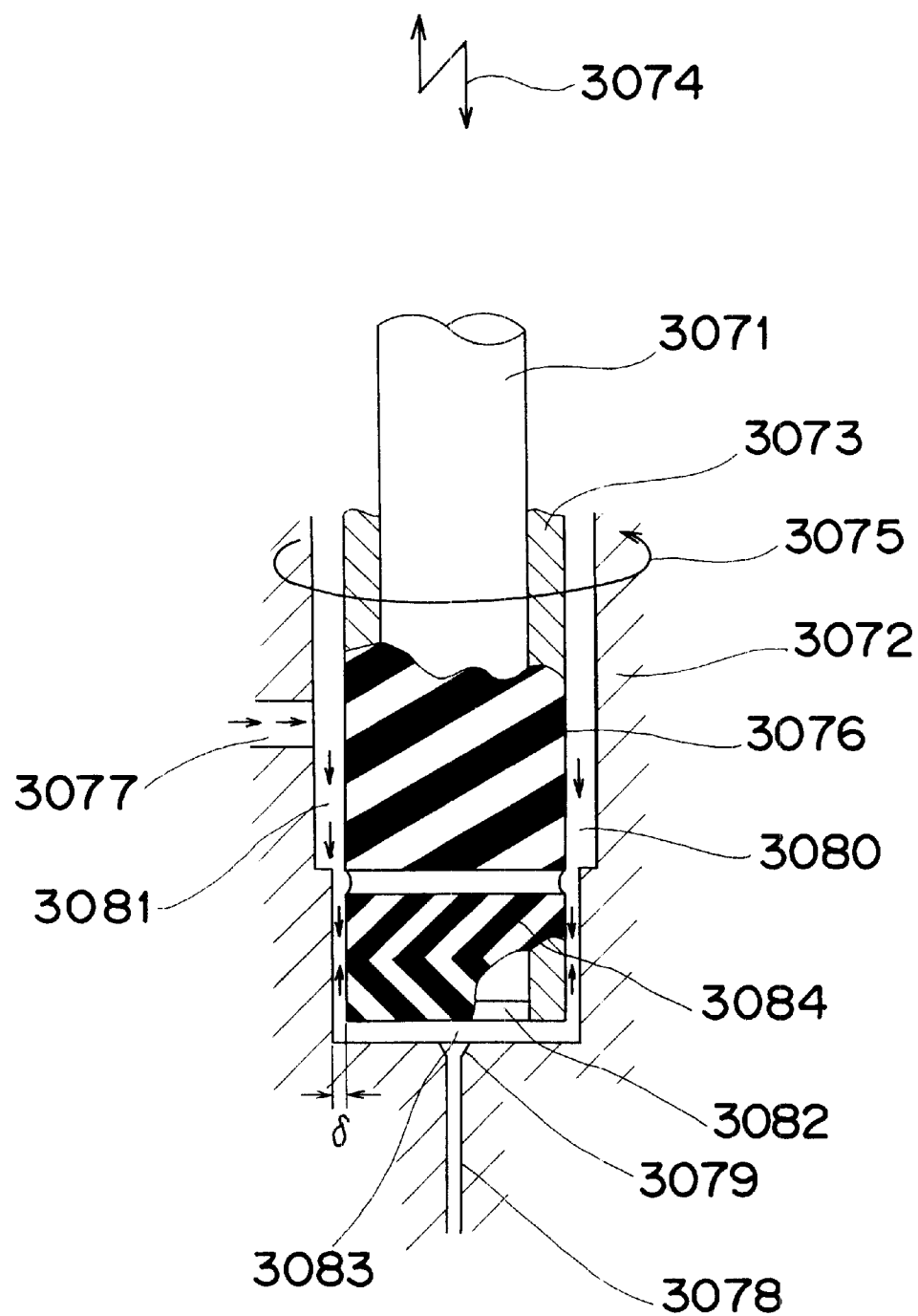
FIG. 15 is a model view showing a third embodiment of the present invention.

FIG. 15 shows a third embodiment of the present invention, wherein, as in the case of the second embodiment, an effect of blocking an outflow of a fluid from the discharge nozzle in a state the intermittent coating is not being performed is provided by forming a radial dynamic pressure seal between the outer peripheral surface on the discharge side of the sleeve and its opposed surface, which are relatively moved surfaces.

Reference numeral 3071 denotes a piston, reference numeral 3072 denotes a housing, and reference numeral 3073 denotes a sleeve. As in the case of the first and second embodiments, the piston 3071 and the sleeve 3073 are similarly driven by an axial direction drive device (for driving reciprocal and axial movement shown by an arrow 3074) and a rotation transmitting device (for driving rotation shown by an arrow 3075), respectively. Reference numeral 3076 denotes a screw groove, and reference numeral 3077 is a suction port of a fluid. Reference numeral 3078 denotes a discharge nozzle and reference numeral 3079 denotes an opening of the discharge nozzle 3078. Reference numeral 3080 denotes a coating fluid and reference numeral 3081 denotes a pump chamber. Reference numeral 3082 denotes a squeeze pump. The portion positioned at reference numeral 3083 is the upstream side of the discharge nozzle 3078.

Reference numeral 3084 denotes a radial dynamic pressure seal (black solid portion is a groove) formed between the outer peripheral surface of the sleeve 3073 on the discharge side and its opposed surface, which are the relatively moved surfaces. A sufficiently narrow gap d between the outer peripheral surface of the sleeve and its opposed surface is formed to obtain a seal pressure equal to or higher than the maximum press generated by the screw groove pump. In a state that the piston 3071 is being stopped, an outflow of the fluid is blocked due to the pumping pressure of this radial dynamic pressure seal 3084.

Since a dynamic pressure seal is formed on the end surface of the sleeve in the second embodiment, influence of thermal expansion of a member in the axial direction or the like needs to be considered to control the gap between the end surface and its opposed surface. However, since the dynamic pressure seal is formed on the outer peripheral portion of the sleeve in this embodiment, a gap d for effectively generating the dynamic pressure seal can be easily set.

Figure 16:
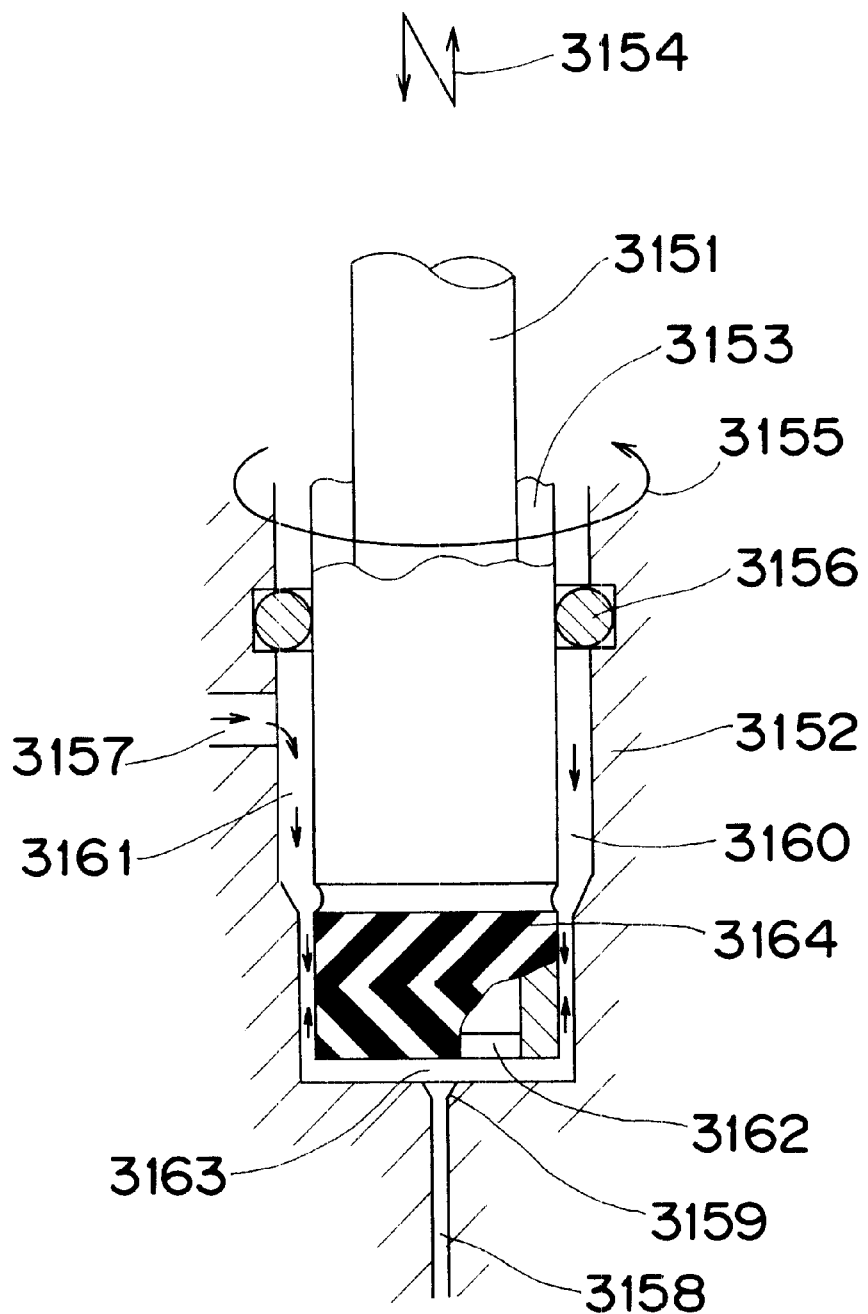
FIG. 16 is a model view showing a fourth embodiment of the present invention.

FIG. 16 shows a fourth embodiment of the present invention, wherein a high-pressure fluid is fed to a dispenser by omitting a screw groove pump as one example of a fluid feed device and utilizing a pressure generation source disposed outside. As in the case of the third embodiment, in a state that intermittent coating is not being performed, an outflow of a fluid from the discharge nozzle is blocked by forming a radial dynamic pressure seal between the outer peripheral surface on the discharge side of the sleeve and its opposed surface, which are relatively moved surfaces.

Reference numeral 3151 denotes a piston, reference numeral 3152 denotes a housing, and reference numeral 3153 denotes a sleeve. As in the case of the first to third embodiments, the piston 3151 and the sleeve 3153 are similarly driven by an axial direction drive device (for driving reciprocal and axial movement shown by an arrow 3154) and a rotation transmitting device (for driving rotation shown by an arrow 3155), respectively. Reference numeral 3156 denotes a fluid seal, and reference numeral 3157 is a suction port of a fluid. Reference numeral 3158 denotes a discharge nozzle and reference numeral 3159 denotes an opening of the discharge nozzle 3158. Reference numeral 3160 denotes a coating fluid and reference numeral 3161 denotes a pump chamber. Reference numeral 3162 denotes a squeeze pump. The portion positioned at reference numeral 3163 is the upstream side of the discharge nozzle 3158.

Reference numeral 3164 denotes a radial dynamic pressure seal (black solid portion is a groove) formed between the outer peripheral surface of the sleeve 3163 on the discharge side and its opposed surface, which are the relatively moved surfaces. In a state that the piston 3151 is being stopped, an outflow of the fluid is blocked by settling $P_s > P_{s0}$ where a pressure of the fluid feed source disposed outside is $P_{s0}$ and the pumping pressure of this radial dynamic pressure seal 3164 is $P_s$.

Figure 17:
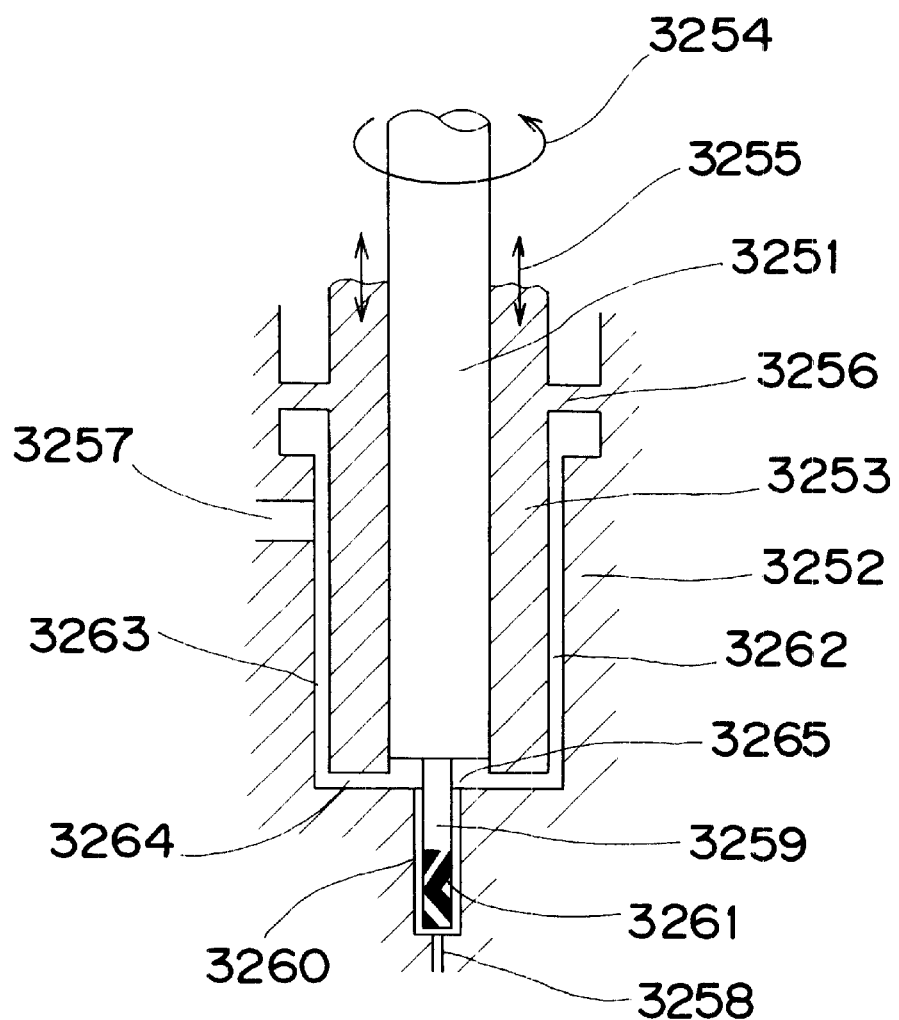
FIG. 17 is a model view showing a fifth embodiment of the present invention.

FIG. 17 shows a fifth embodiment of the present invention, wherein, on the contrary to the first to fourth embodiments, a dynamic pressure seal is formed while rotating a central shaft, and an axial direction motion for generating a squeeze effect is provided to the sleeve housing this central shaft. Furthermore, the fluid feed device utilizes a pressure (veneration source disposed outside.

Reference numeral 3251 denotes a central shaft, reference numeral 3252 denotes a housing, and reference numeral 3253 denotes a sleeve. The piston 3251 and the sleeve 3253 are driven by a rotation transmitting device (for driving rotation shown by an arrow 3254) and an axial direction drive device (for driving reciprocal and axial movement shown by an arrow 3255), respectively. Reference numeral 3256 denotes an elastic Support portion of the sleeve 3253, and reference numeral 3257 is a suction port of a fluid. Reference numeral 3258 denotes a discharge nozzle and reference numeral 3259 denotes a small-diameter portion of the central shaft 3251. Reference numeral 3260 denotes a discharge side sleeve for housing this small-diameter portion 3259 and reference numeral 3261 denotes a radial dynamic pressure seal (black solid portion is a groove) formed between the small-diameter portion 3259 and the discharge-side sleeve 3260. Reference numeral 3262 denotes a coating fluid and reference numeral 3263 denotes a pump chamber. Reference numeral 3264 denotes a squeeze pump. A portion 3265 positioned at the small-diameter portion 3259 and an opening of the discharge-side sleeve 3260 is the upstream side of the discharge nozzle 3258.

As in the case of the fourth embodiment, in a state that the sleeve 3253 is being stopped, an outflow of the fluid is similarly blocked by setting $P_s > P_{s0}$ where a pressure of the fluid feed source disposed outside is $P_{s0}$, and the pumping pressure of this radial dynamic pressure seal 3261 is $P_s$.

In this embodiment, the dynamic pressure seal 3261 is disposed in the vicinity of the discharge nozzle 3258. Therefore, even when a fluid is blocked for a long time, the position of an interface where the fluid is brought into contact with atmosphere can be maintained in the vicinity of the discharge nozzle 3258. Thus, coating can be restarted smoothly even after a stop state for a long time.

When a fluid feed device is built in, for example, the screw groove may be formed in the relatively moved surfaces of the central shaft 3251 and the sleeve 3253.

Figure 18A:
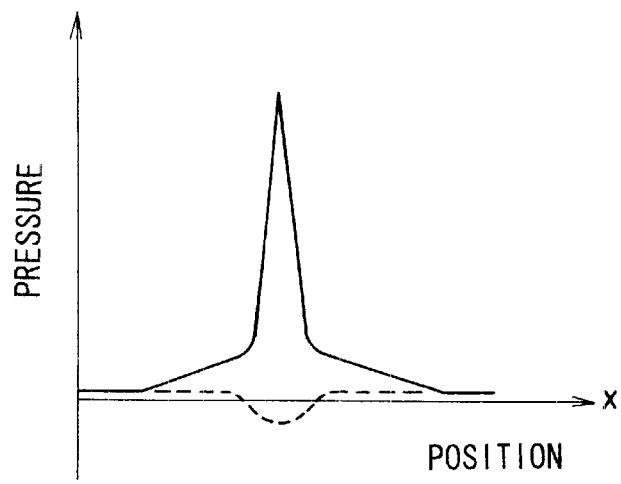
FIG. 18A is a graph showing pressure distribution in a sixth embodiment of the present invention.
Figure 18B:
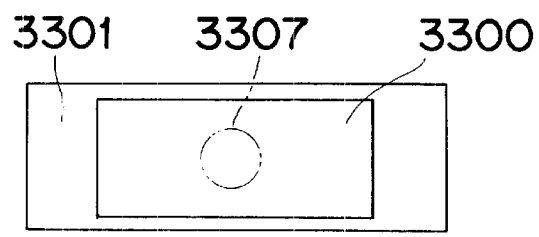
FIG. 18B is a model plan view showing the sixth embodiment.
Figure 18C:
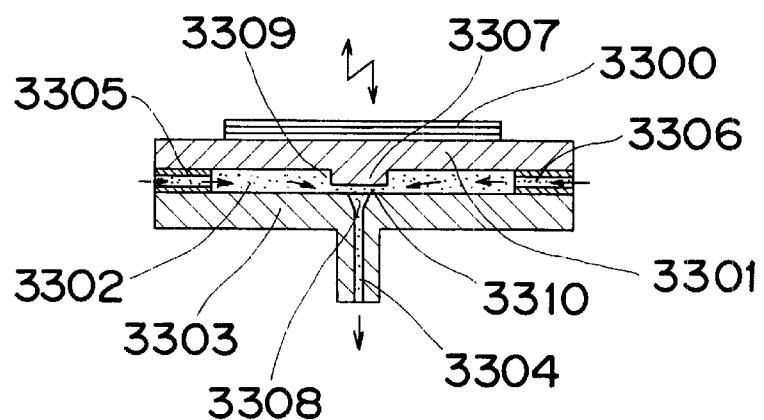
FIG. 18C is a model front view showing the sixth embodiment.

FIGS. 18A–18C show a dispense head according to a sixth embodiment of the present invention, wherein a piezoelectric element, which is an electro-magnetostrictive element, is used as a device for relatively moving wall surfaces in a direction of a gap (that is, vertical direction in FIG. 18C) while keeping the gap narrow. In addition to this piezoelectric element, for example, a laminated giant-magnetostrictive element or the like may be used.

Reference numeral 3300 denotes a piezoelectric element. Reference numeral 3301 denotes an oscillation (vibration) plate. Reference numeral 3302 denotes a pump chamber. Reference numeral 3303 denotes a base. Reference numeral 3304 denotes a discharge nozzle. Reference numerals 3305 and 3306 denote suction ports. Reference numeral 3307 denotes a piston protruded from the oscillation plate 3301. Reference numeral 3308 is the upstream side of the discharge nozzle 3304. Reference numeral 3309 denotes an outer periphery of the piston 3307. By a fluid feed device disposed outside, a pressurized fluid is fed to the pump chamber 3302 via the suction ports 3305, 3306.

This form is very similar to that of a conventional inkjet-type dispenser (FIG. 21), but very different in a pressure generation principle. While the conventional inkjet-type dispenser utilizes compressibility of a fluid, this embodiment utilizes a squeeze effect generated between the piston 3307 end surface and its opposed surface. This is a new type that can be called "squeeze-jet type" in contrast to a conventional bubble jet type or the like.

Therefore, this embodiment is similar to the embodiments described above in that the coating amount per dot is hardly affected by viscosity of the fluid and coating time.

Furthermore, when fluid resistance between the upstream side 3308 of the discharge nozzle and the piston outer periphery 3309 is $R_p$, and discharge nozzle resistance is $R_n$, the ratio of the two fluid resistances $R_p/R_n$ is hardly affected by the discharge nozzle resistance by setting this ratio to be sufficiently large.

Figure 22:
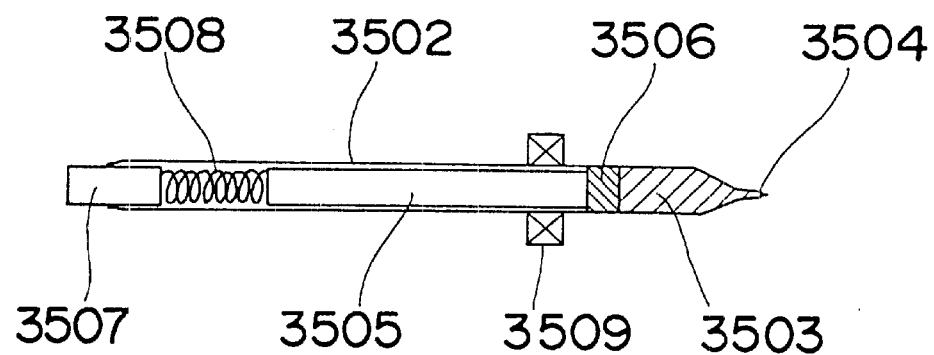
FIG. 22 is a view showing an example of a conventional design of a jet device using a giant-magnetostrictive element.
Figure 23:
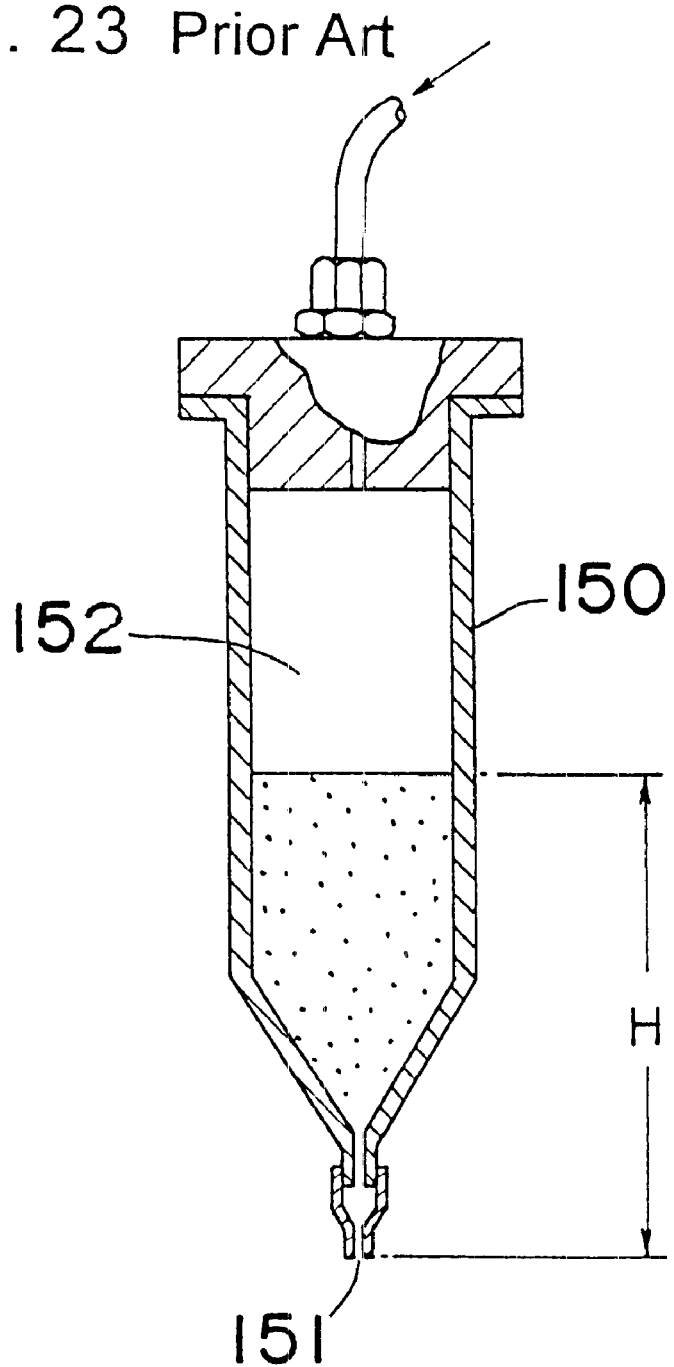
FIG. 23 is a view showing a conventional air pulse-type dispenser.

The pressure generated between the piston 3307 and its opposed surface is inversely proportional to the third power of the gap $h_0$ from the equation (7). Therefore, when the gap $h_0$ is made sufficiently small, a high squeeze pressure can be generated even if the outer diameter of the piston 3307 is made small. However, a site where a high pressure is generated is only the piston 3307. While, the conventional inkjet-type dispenser (FIG. 22) receives a fluid pressure having a gentle distribution by using the whole oscillation plate (reference numeral 3402 in FIG. 22), the protrusion having a small area on the piston 3307 receives a fluid pressure having a sharp edge in the above embodiment of the present invention as shown in FIG. 18A. Since a value obtained by surface-integrating a pressure on the oscillation plate is a load on the whole piezoelectric element, an extremely high generated pressure is obtained, but a load received by the piezoelectric element is small in the dispense head of this embodiment.

Furthermore, since the site where a high pressure is generated is only in the vicinity of the discharge port in this dispense head, a high-viscosity fluid can be applied in a very small amount. A load generated by a bimorph-type (thin plate) piezoelectric element is limited, and coating with a high-viscosity fluid is difficult in the conventional inkjet-type dispenser. With the present invention, not only performances of the conventional inkjet-type dispenser can be greatly improved, but a new use of a subminiature head driven by the electro-magnetostrictive element is developed.

Furthermore, the oscillation plate and the protrusion of the piston formed on its relatively moved surface may be formed on either of the oscillation plate and the relatively moved surfaces, but when this protrusion is formed on the oscillation plate 3301 side as in this embodiment, the gap between the whole piston end surface and its opposed surface can be maintained in parallel at all times against deformation by the piezoelectric element. Therefore, a squeeze pressure can be more effectively generated.

Figure 19A:
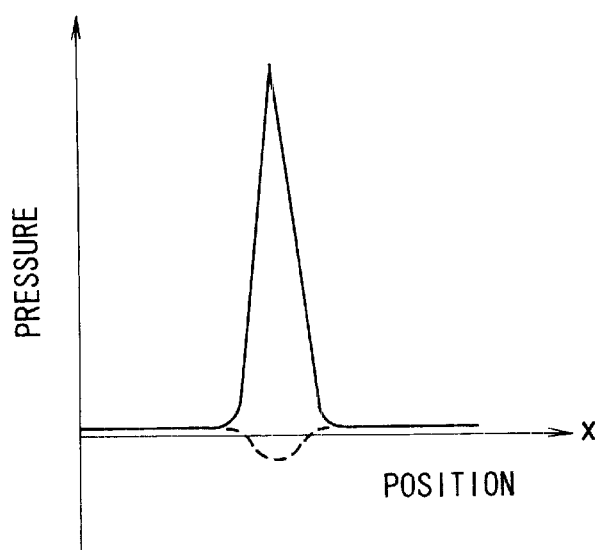
FIG. 19A is a graph showing pressure distribution in a seventh embodiment of the present invention.
Figure 19B:
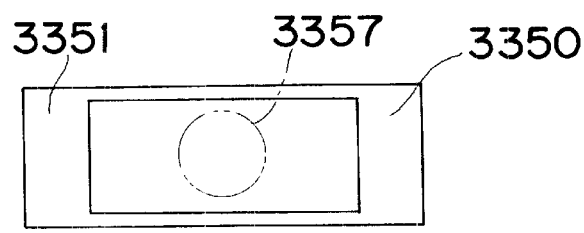
FIG. 19B is a model plan view showing the seventh embodiment.
Figure 19C:
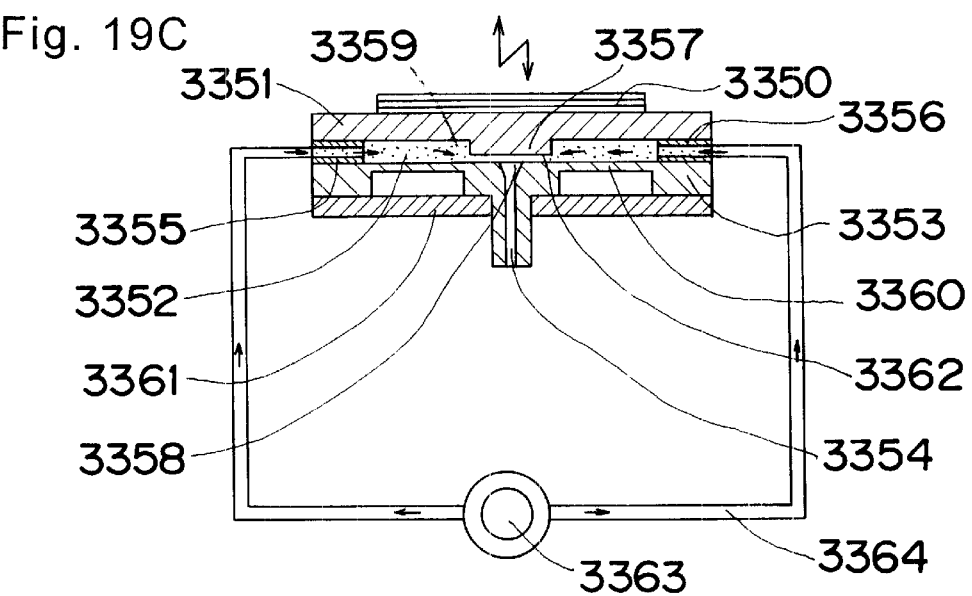
FIG. 19C is a model front view showing the seventh embodiment.

FIGS. 19A–19C show a seventh embodiment of the present invention, which is obtained by further improving the aforementioned sixth embodiment.

Reference numeral 3350 denotes a piezoelectric element. Reference numeral 3351 denotes an oscillation (vibration) plate. Reference numeral 3352 denotes a pump chamber. Reference numeral 3353 denotes a base. Reference numeral 3354 denotes a discharge nozzle. Reference numerals 3355 and 3356 denote suction ports. Reference numeral 3357 denotes a piston protruded from the oscillation plate 3351. Reference numeral 3358 is the upstream side of the discharge nozzle 3354. Reference numeral 3359 denotes an outer periphery of the piston 3357. Reference numeral 3360 denotes an elastically deformable portion formed on a part of the base 3353. Reference numeral 3361 denotes a reinforcing plate. Reference numeral 3362 denotes a squeeze pump, which serves as a fluid feed device. Reference numeral 3363 denotes piping.

By providing a part of a wall surface constituting the pump chamber 3352 with the elastically deformable portion 3360, a changing pressure of a border of the piston 3357 (outer periphery 3359 of the piston), which is a squeeze pressure generation source, can be smoothed. That is, there is obtained an effect of an accumulator for smoothing the pressure change of the pump chamber 3352, with the pressure change occurring due to influence of the squeeze pressure. As a result, as shown in FIG. 19A, pressure changes other than in the piston 3357 portion are eliminated, and a load of the piezoelectric element can be further reduced. Furthermore, the discharge amount precision can be further stabilized. As the method for smoothing the pressure change, any method can be used in addition to elastic deformation of the wall surface.

FIG. 20 shows a specific embodiment of a dispenser as a whole to which the present invention is applied and a constitution where a central shaft piercing through a hollow outer peripheral shaft is provided with an axial direction drive device.

Reference numeral 3100 denotes a first actuator, and a giant-magnetostrictive element, piezoelectric element, electromagnetic solenoid, or the like is used. In this embodiment, a laminated piezoelectric actuator, which has excellent response and with which high response and large generated load can be obtained, is used.

Reference numeral 3101 denotes a piston driven in the axial direction by the piezoelectric actuator 3100, which is the first actuator. The first actuator is disposed in an upper cylinder 3102. Reference numeral 3103 is a motor as a second actuator, which provides a relative rotary motion between a sleeve 3104 for housing the piston 3101 and an intermediate cylinder 3105. Reference numeral 3106 denotes a rotor of the motor 3103, and reference numeral 3107 denotes a stator of the motor 3103.

Reference numeral 3108 denotes a screw groove for forcibly feeding a fluid to the discharge side, which is formed on an outer surface of the sleeve 3104. A screw groove pump chamber 3110 for obtaining a pumping action by a relative rotation of the sleeve 3104 and a lower cylinder 3109 is formed between the sleeve 3104 and the lower cylinder 3109.

Furthermore, a suction hole 3111 communicated with the screw groove pump chamber 3110 is formed in the lower cylinder 3109. Reference numeral 3112 denotes a discharge nozzle attached to a lower end portion of the lower cylinder 3109, and a discharge hole 3113 is formed in its central portion. Reference numeral 3114 denotes a discharge side-thrust end surface of the sleeve 3104. Reference numerals 3115 and 3116 denote ball bearings for supporting the sleeve 3104. For example, when a gap between the thrust end surface and its opposed surface is set to be sufficiently narrow, and a dynamic pressure thrust seal that can generate a seal pressure equal to or higher than the maximum pressure that can be generated by a screw groove 3108 is formed, an outflow of the fluid can be blocked in a state that the piston 3101 is stopped.

Furthermore, reference numeral 3117 denotes a flange disposed on top of the piston 3101. Reference numeral 3118 denotes a disc portion attached to the piezoelectric actuator 3100. Reference numeral 3119 denotes a displacement sensor for detecting a position of the piston 3101 in the axial direction. Reference numeral 3120 denotes a hinge formed so as to elastically deform the flange 3117 in the axial direction. Dimensions of each member are determined so that an appropriate pre-load is applied to the piezoelectric actuator 3100 due to the elastic deformation of the hinge 3120.

Figure 25:
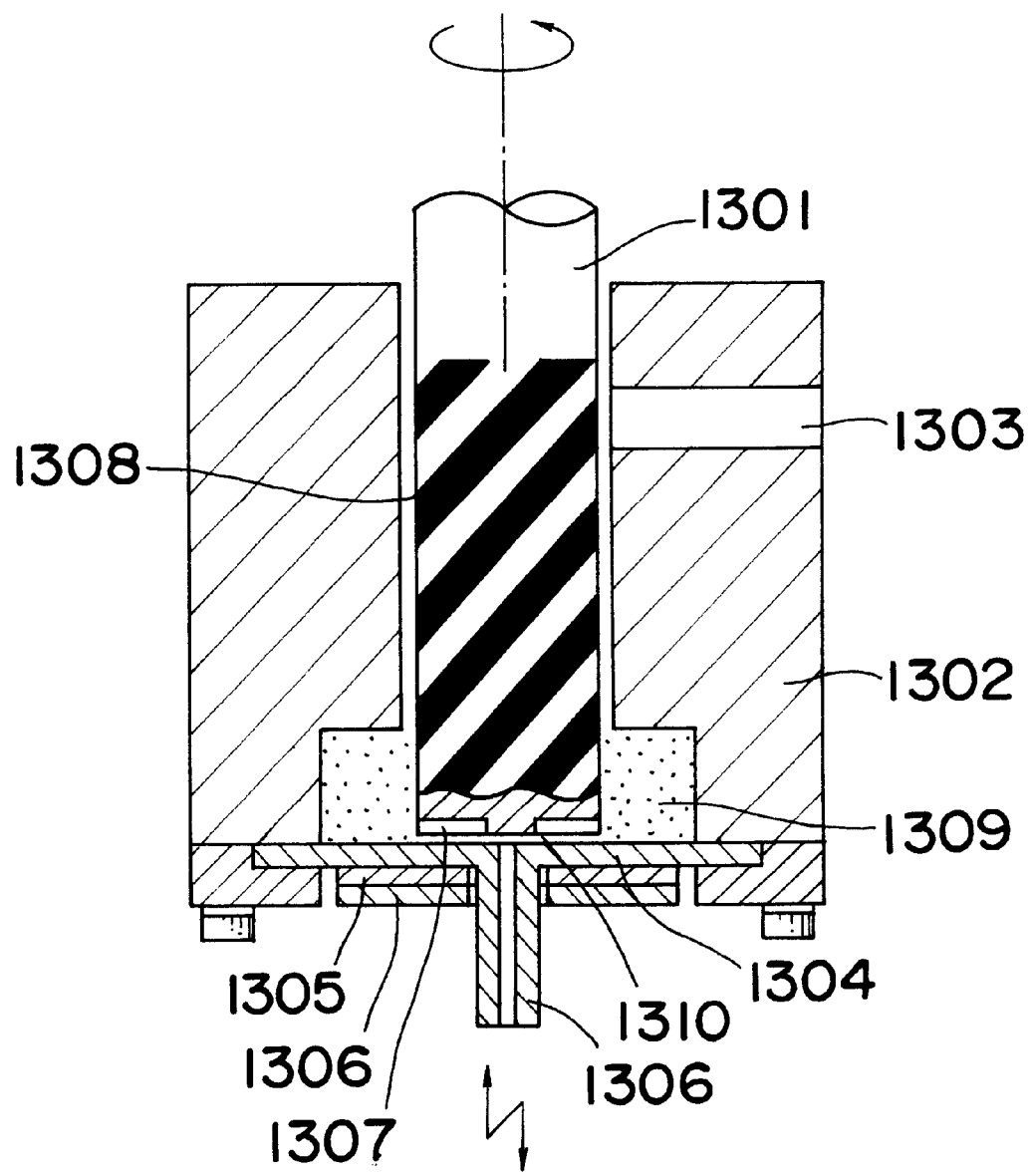
FIG. 25 is a front sectional view showing a dispenser according to a further embodiment of the present invention.

FIG. 25 is a front sectional view showing a dispenser according to a further embodiment of the present invention. That is, FIG. 25 shows an example in which a thin-plate piezoelectric element (e.g., bimorph type) is mounted on the thrust plate instead of giving an axial displacement to the thrust plate with an electromagnetic solenoid, so that the thrust plate is driven axially by the expansion and contraction effect of this piezoelectric element (motor, bearing, and the like are omitted in the figure).

Reference numeral 1301 denotes a rotary shaft, 1302 denotes a housing, 1303 denotes an inlet port, 1304 denotes a thrust plate (sleeve) of a thin plate, 1305 and 1306 denote thin-film piezoelectric elements mounted on the thrust plate 1304, 1306 denotes a discharge nozzle integrated with the thrust plate 1304, 1307 denotes a groove of a thrust dynamic seal formed at an end face of the rotary shaft 1301, 1308 denotes thread grooves formed in the relative movement surfaces of the rotary shaft 1301 and the housing 1302 that houses this rotary shaft 1301 therein, and 1309 denotes a pump chamber (the thread groove part is blacked out in the figure).

With a voltage applied to the thin-film piezoelectric elements 1305, 1306, the piezoelectric elements are expanded and contracted radially, causing the thrust plate 1304 to be deformed axially. As a result, the gap size of the gap portion 1310 between the rotary shaft 1301 and its opposing face is changed.

In this case, the drive part is given by only the thrust plate, and a light load is imposed on the piezoelectric elements serving as actuators, thus allowing intermittent operation at high frequency to be implemented. By the drive with high frequency, there occurs a large squeeze pressure to the gap portion 1310, so that high-speed intermittent coating process by making use of this squeeze pressure can be implemented.

Since thin-plated piezoelectric elements are used, the dispenser body can be made very simple and small in size. Therefore, when a plurality of dispensers are accommodated close to one another in a common housing, there can be provided a multi-head type coating device capable of controlling the flow rate for each head independently.

Thus, with the present invention applied, it becomes possible to convey powder and granular material and arbitrarily control the flow rate of the powder and granular material while the overall flow passage ranging from the inlet side to the discharge passage is kept in a mechanical non-contact state. Therefore, the present invention is quite effective for flow rate control of powder and granular materials with which mechanical squeezing and breakage would cause not a few issues due to flow passage shutoff, for example, adhesive, electrically conductive paste, solder cream, fluorescent material, artificial blood, magnetic fluids, and the like.

The object as a specific device to which the present invention is applied is not limited to the dispenser of the embodiment that covers minute flow rates, and the present invention may be applied also to various types of equipment and devices for the aforementioned powder and granular material manufacturing process.

Figure 24:
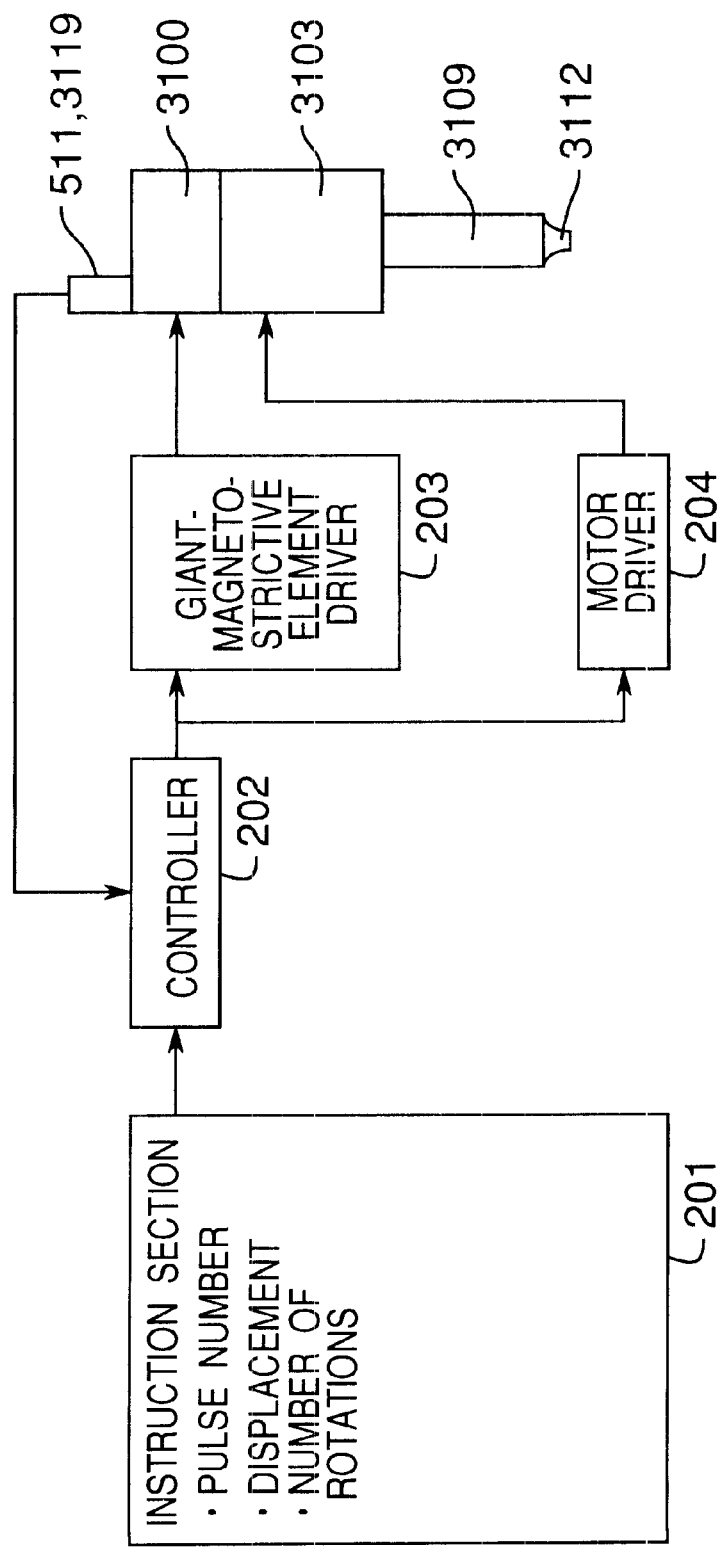
FIG. 24 is a block diagram for driving the fluid feed device and the relatively oscillating device.

In the embodiments, for example, the first actuator 3100 and the second actuator 3103 are controlled by a controller 202, a giant-magnetostrictive element driver 203, and a motor driver 204 based on instruction signals (including pulse number, displacement, number of rotations, or the like) from an instruction section 201 and detected results obtained from sensors 511, 3119 in FIG. 24, in order that the discharge amount $Q_s$ (mm³) per dot is controlled by controlling the amplitude Δh; or a mean discharge amount $Q_{sm}$ (mm³) is controlled by controlling the amplitude Δh or the number n of coating per unit time. That is, as shown in FIG. 24, as representation example, under the control of the controller 202, a giant-magnetostrictive element serving as the first actuator 3100 is controlled by the giant-magnetostrictive element driver 203 based on instruction signals (including previously-set or -stored pulse numbers, displacements (for example, see FIG. 9.), numbers of rotations, or the like) from the instruction section 201 and detected results obtained from the sensors 511, 3119. Similarly, under the control of the controller 202, a motor serving as the second actuator 3103 is also controlled by the motor driver 204 based on instruction signals (including previously-set or -stored pulse numbers, displacements (for example, see FIG. 9.), numbers of rotations, or the like) from the instruction section 201 and detected results obtained from the sensors 511, 3119.

In the embodiments, one example of the gap h is not lager than 0.2 mm, preferably 0.1 mm, more preferably several tens of microns. As specified example, when the viscosity coefficient of a fluid is 3,000–200,000CPS, and the outer diameter of the shaft is 10 mm or less, and the gap is 0.2 mm or less, the fluid discharging method and device can be applied to application of adhesive, including conductive capsules, for attaching components to a board in forming circuits for liquid crystal displays or semiconductor devices; or fluorescent substance or Ag or Au paste for forming electrodes for various kinds of displays. Please note that as the viscosity coefficient of a fluid increases, the gap can be increased.

One example of the fluid is Ag paste with 5–200 Pa·s (5,000–200,000CPS), epoxy resin with 5–200 Pa·s (5,000–200,000CPS) for adhesive, UV resin with 0.09–11 Pa·s (90–11,000CPS) for adhesive, or the like. As the above adhesive, adhesive insulating epoxy resin including conductive capsules can be used for electrically connecting electrodes of components to electrodes of a board in forming circuits for liquid crystal displays or semiconductor devices.

As one example of the fluid, in coating an adhesive on an article such as a circuit board CB (for example, see FIG. 1A), circle dots each having 0.5 mm-diameter and 0.2–0.25 mm-height can be intermittently formed and/or strips or lines each having 0.5 mm-width can be formed by continuously forming the circle dots while forming the circle dots at a position adjacent to or in the vicinity of the formed circle dots. As one example, in coating a solder cream on an article such as a circuit board CB (for example, see FIG. 1), square dots each having 0.5 mm-length, 0.5 mm-width, and 100–150 μm-height can be intermittently formed and/or strips or lines each having 0.5 mm-width can be continuously formed. As one example, in coating a fluorescent material for CRT, strips or lines each having 100 μm-width and height on the order of Å an be continuously formed.

The above embodiments of the present invention can be applied to a production process in fields such as electronic components, household electric appliance, and the like, various fluids such as adhesives, solder pastes, fluorescent substances greases, paints, hot melt adhesives, chemicals, food, and so forth are discharged and supplied in a fixed amount at high speed and in high precision intermittently or continuously.

Thus, new findings (that is, invention or discovery) obtained from the theoretical analysis, for example, the relationship of $R_p/R_n$ and flow rate precision, condition of the fluid feed device required to stabilize the discharge flow rate, condition of $r_i/r_0$ for maximizing the flow rate, and so forth can be applied to all the embodiments of the present invention.

The following effects are obtained by the fluid rotating device using the present invention.

1. Intermittent coating can be performed with ultralight speed response, which is difficult with a conventional air-type or screw groove-type dispenser.
2. Since the flow passage from the suction port through the discharge flow passage can be in a non-contact state at all times, a powder fluid mixed with fine particles can be responded, which is difficult with a conventional inkjet-type dispenser.
3. The dispenser main body can have a simple constitution.
4. The dispenser of the present invention can further have the following characteristics as well:
   (i) High-speed coating with a high viscosity fluid can be performed.
   (ii) An ultrafine amount can be discharged in high precision.
   (iii) Thread and hanging of the fluid can be prevented.

When the present invention is used, for example, for fluorescent substance coating of PDP, CRT display, as a dispenser for surface mounting and so forth, its merits can be fully exhibited, and the effect is immense.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of discharging a fluid from a discharging device comprising a housing, a piston moveable in an axial direction within the housing, a sleeve arranged at an outer peripheral portion of the piston and moveable in a rotary direction within the housing and a thread groove formed in the sleeve, said method comprising:

feeding a fluid into a gap defined between two surfaces in a closed space; and relatively oscillating the two surfaces to apply relative oscillation with a frequency to the fluid in the gap so as to apply a squeezing pressure to the fluid in the gap, and thus intermittently discharging the fed fluid through a discharge port provided in either one of the two surfaces by using the squeezing pressure, wherein a discharge amount $Q_s$ (mm³) per dot is generally represented by $$Q_s = \frac{1}{R_n + R_p}\left\{(r_0^2 - r_i^2) + 2r_i^2 \ln\frac{r_i}{r_0}\right\}\left(\frac{6\mu\Delta h}{h_0^3}\right), \text{ and}$$

wherein an amplitude of a change of the gap between the two surfaces is Δh (mm), a central value of a size of the gap is h0 (mm), a mean radius of outer peripheries of the two surfaces is r0 (mm), a mean radius of an opening of the discharge port is ri (mm), a viscosity coefficient of the fluid is μ (kgf·sec/mm²), fluid resistance between the outer peripheries of the two surfaces and the opening of the discharge port is $R_p$ (kgf·sec/mm⁵), and fluid resistance at the discharge port is Rn (kgf·sec/mm⁵), is controlled by controlling the amplitude Δh.

2. A method of discharging a fluid according to claim 1, wherein a mean discharge amount $Q_{sm}$ (mm³) generally represented by $$Q_{sm} = \frac{n}{R_n + R_p}\left\{(r_0^2 - r_i^2) + 2r_i^2 \ln\frac{r_1}{r_0}\right\}\left(\frac{6\mu\Delta h}{h_0^3}\right), \text{ and}$$

wherein an amplitude of a change of the gap between the two surfaces is $\Delta h$ (mm), a central value of a size of the gap is $h_0$ (mm), a mean radius of outer peripheries of the two surfaces is $r_0$ (mm), a mean radius of an opening of the discharge port is $r_i$ (mm), a viscosity coefficient of the fluid is $\mu$ (kgf·sec/mm²), fluid resistance between the outer peripheries of the two surfaces and an opening of the discharge port is $R_p$ (kgf·sec/mm⁵), fluid resistance at the discharge port is $R_n$ (kgf·sec/mm⁵), and a number of coatings per unit time is n (1/sec), is controlled by controlling the amplitude $\Delta h$ or the number n of coatings per unit time.

3. A fluid discharge device comprising:
a fluid feed device for feeding a fluid into a gap defined between two surfaces in a closed space; and
a relatively oscillating device for relatively oscillating the two surfaces to apply relative oscillation with a frequency to the fluid in the gap so as to apply a squeezing pressure to the fluid in the gap, so that the fed fluid is intermittently discharged through a discharge port provided in either one of the two surfaces by using the squeezing pressure,
wherein said fluid feed device comprises a housing having an axial direction, a piston within the housing and moveable in the axial direction and a sleeve arranged at the outer peripheral portion of the piston and being moveable in a rotary direction within the housing,
wherein the sleeve has a thread groove formed thereon, and
wherein the following is satisfied:

$$Q_{gmax} > \frac{0.2n}{\varphi}Q_s$$

wherein a maximum discharge amount of the fluid that can be fed by the fluid feed device is $Q_{gmax}$ (mm³/sec), a coating amount per dot discharged by the two surfaces is $Q_s$ (mm³), a number of coatings per unit time is n (1/sec), one cyclic period of coating process is $T_s$ (sec), and a period from a time when the two surfaces are positioned so that the gap therebetween is maximized to a time when the two surfaces are positioned so that the gap therebetween is minimized is $T_g$ (sec), and wherein $\phi = T_g/T_s$.

4. A fluid discharge device according to claim 3, wherein the following is satisfied:

$$Q_{gmax} > \frac{n}{\varphi}Q_s$$

5. A fluid discharge device according to claim 3, wherein the following is satisfied:

$$Q_{gmax} > \frac{1}{\varphi}\cdot\frac{n}{(R_n+R_p)}\left\{(r_0^2 - r_i^2) + 2r_i^2\ln\frac{r_i}{r_0}\right\}\left(\frac{6\mu\Delta h}{h_0^3}\right),$$

wherein an amplitude of a change of the gap between the two surfaces is $\Delta h$ (mm), a central value of a size of the gap is $h_0$ (mm), a mean radius of outer peripheries of the two surfaces is $r_0$ (mm), a mean radius of an opening of the discharge port is $r_i$ (mm), a viscosity coefficient of the fluid is $\mu$ (kgf·sec/mm²), fluid resistance between the outer peripheries of the two surfaces and an opening of the discharge port is $R_p$ (kgf·sec/mm⁵), fluid resistance at the discharge port is $R_n$ (kgf·sec/mm⁵) and a number of coatings per unit time is n (1/sec), a maximum discharge amount of the fluid that can be fed by the fluid feed device is $Q_{gmax}$ (mm³/sec), one cyclic period of coating process is $T_s$ (sec), and a period from a time when the two surfaces are positioned so that the gap therebetween is maximized to a time when the two surfaces are positioned so that the gap therebetween is minimized is $T_g$ (sec), and wherein $\phi = T_g/T_s$.

6. A fluid discharge device according to claim 3, wherein the fluid feed device is a screw groove pump.

7. A fluid discharge device comprising:
a fluid feed device for feeding a fluid into a gap defined between two surfaces in a closed space; and
a relatively oscillating device for relatively oscillating the two surfaces to apply relative oscillation with a frequency to the fluid in the gap so as to apply a squeezing pressure to the fluid in the gap, so that the fed fluid is intermittently discharged fluid through a discharge port provided in either one of the two surfaces by using the squeezing pressure,
wherein said fluid feed device comprises a housing having an axial direction, a piston within the housing and moveable in the axial direction and a sleeve arranged at the outer peripheral portion of the piston and being moveable in a rotary direction within the housing,
wherein the sleeve has a thread groove formed thereon, and
wherein $R_p/R_n > 0.5$ is satisfied when fluid resistance between an outer peripheries of the two surfaces and an opening of the discharge port is $R_p$ (kgf·sec/mm⁵), fluid resistance at the discharge port is $R_n$ (kgf·sec/mm⁵).

8. A fluid discharge device according to claim 7, wherein $R_p/R_n > 2$ is satisfied.

9. A fluid discharge device according to claim 7, wherein $R_p/R_n > 5$ is satisfied.

10. A fluid discharge device comprising:
a fluid feed device for feeding a fluid into a gap defined between two surfaces in a closed space; and
a relatively oscillating device for relatively oscillating the two surfaces to apply relative oscillation with a frequency to the fluid in the gap so as to apply a squeezing pressure to the fluid in the gap, so that the fed fluid is intermittently discharged through a discharge port provided in either one of the two surfaces by using the squeezing pressure,
wherein said fluid feed device comprises a housing having an axial direction, a piston within the housing and moveable in the axial direction and a sleeve arranged at the outer peripheral portion of the piston and being moveable in a rotary direction within the housing,
wherein the sleeve has a thread groove formed thereon, and
wherein $0.1 < r_i/r_0 < 0.3$ is satisfied when the mean radius of outer peripheries of the two surfaces is $r_0$ (mm) and the mean radius of an opening of the discharge port is $r_i$ (mm).

11. A fluid discharge device according to claim 10, wherein $r_i/r_0 \approx 0.2$ is satisfied.

12. A method of discharging a fluid according to claim 1, wherein the relatively oscillating device is an electro-magnetostrictive element.

13. A method of discharging a fluid according to claim 1, wherein the fluid is discharged by utilizing a rise of a localized pressure of the fluid between the two surfaces in a vicinity of the discharge port.

14. A fluid discharge device according to claim 6, wherein a protrusion is formed on a position of a portion of one of mi the two surfaces in a vicinity of the discharge port so that the gap between the two surfaces is smaller at the position of the portion than in other portions of the one of the two surfaces.

15. A fluid discharge device according to claim 14, wherein a flow passage except for a portion between the protrusion and its opposed surface is equipped with a device for smoothing a changing pressure.

16. A method of discharging a fluid according to claim 1, further comprising:
while moving a target surface onto which the fluid is discharged relative to a discharge nozzle connected to the discharge port, arranging relative positions of the target surface and the discharge nozzle and a timing of a displacement input signal h when discharging the fluid,
wherein discharging the fluid is performed at a phase generally $\Delta\theta=\Pi/2$ ahead of a displacement input signal h of the gap.

17. A fluid discharge device comprising:
a sleeve for housing a shaft, said sleeve having a thread groove formed thereon;
a housing for housing the shaft and the sleeve;
a device for rotating the sleeve relatively to the housing;
an axial direction drive device for displacing the shaft relatively to the housing in an axial direction of the shaft, a pump chamber being formed by the sleeve and the housing;
a fluid feed device for feeding a fluid to the pump chamber, a suction port and a discharge port of the fluid for connecting the pump chamber to an exterior of the fluid discharge device being formed in the housing; and
a device for forcibly feeding the fluid allowed to flow into the pump chamber to a side of the discharge port by the axial direction drive device,
wherein $R_p/R_n>0.5$ is satisfied when fluid resistance between an outer peripheries of the shaft and an opening of the discharge port is $R_p$ (kgf·sec/mm$^5$), fluid resistance at the discharge port is $R_n$ (kgf·sec/mm$^5$).

18. A fluid discharge device comprising:
a sleeve for housing a shaft, said sleeve having a thread groove formed thereon;
a housing for housing the shaft and the sleeve;
a device for rotating the shaft relatively to the housing;
an axial direction drive device for displacing the sleeve relatively to the housing in an axial direction of the sleeve, a pump chamber being formed by the sleeve and the housing;
a fluid feed device for feeding a fluid to the pump chamber, a suction port and a discharge port of the fluid for connecting the pump chamber to an exterior of the fluid discharge device being formed in the housing; and
a device for forcibly feeding the fluid allowed to flow into the pump chamber to a side of the discharge port by the axial direction drive device,
wherein $R_p/R_n>0.5$ is satisfied when fluid resistance between an outer peripheries of the shaft and an opening of the discharge port is $R_p$ (kgf·sec/mm$^5$), fluid resistance at the discharge port is $R_n$ (kgf·sec/mm$^5$).

19. A fluid discharge device according to claim 17, wherein a seal is formed between the sleeve and the housing so that discharge of the fluid from the discharge port is stopped when driving of the axial direction drive device is stopped.

20. A fluid discharge device according to claim 18, wherein a seal is formed between the sleeve and the housing so that discharge of the fluid from the discharge port is stopped when driving of the axial direction drive device is stopped.

21. A fluid discharge device according to claim 19, wherein $P_s>P_{s0}$ is satisfied when a seal pressure of the seal is $P_s$ and a pressure due to the fluid feed device is $P_{s0}$.

* * * * *

UNITED STATES PATENT AND TRADEMARK OFFICE
CERTIFICATE OF CORRECTION

PATENT NO. : 6,679,685 B2
DATED : January 20, 2004
INVENTOR(S) : Teruo Maruyama et al.

It is certified that error appears in the above-identified patent and that said Letters Patent is hereby corrected as shown below:

Column 26,
Line 66, please replace "port is Rn" with -- port is $R_n$ --.

Column 27,
Line 5, please replace "$Q_{sm} = \dfrac{n}{R_n + R_p}\left\{(r_0^2 - r_i^2) + 2r_i^2 \ln\dfrac{r_1}{r_0}\right\}\left(\dfrac{6\mu\Delta h}{h_0^3}\right)$, and"

with

-- $Q_{sm} = \dfrac{n}{R_n + R_p}\left\{(r_0^2 - r_i^2) + 2r_i^2 \ln\dfrac{r_i}{r_0}\right\}\left(\dfrac{6\mu\Delta h}{h_0^3}\right)$, and --.

Column 29,
Line 10, please replace "mi the two surfaces" with -- the two surfaces --.

Signed and Sealed this

Fifth Day of October, 2004

JON W. DUDAS
*Director of the United States Patent and Trademark Office*